United States Patent
Chen et al.

(10) Patent No.: US 11,108,619 B2
(45) Date of Patent: Aug. 31, 2021

(54) SERVICE SURVIVABILITY ANALYSIS METHOD AND APPARATUS

(71) Applicant: HUAWEI TECHNOLOGIES CO., LTD., Guangdong (CN)

(72) Inventors: Zhitang Chen, Shenzhen (CN); Qibin Wu, Dongguan (CN); Yanhui Geng, Montreal (CA)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 71 days.

(21) Appl. No.: 16/514,261

(22) Filed: Jul. 17, 2019

(65) Prior Publication Data

US 2019/0342145 A1   Nov. 7, 2019

Related U.S. Application Data

(63) Continuation of application No. PCT/CN2017/115040, filed on Dec. 7, 2017.

(30) Foreign Application Priority Data

Jan. 18, 2017   (CN) .......................... 201710035513.X

(51) Int. Cl.
*H04L 12/24* (2006.01)
(52) U.S. Cl.
CPC ...... *H04L 41/0631* (2013.01); *H04L 41/0677* (2013.01); *H04L 41/0681* (2013.01);
(Continued)
(58) Field of Classification Search
CPC .. G06Q 10/0635; G06Q 50/32; H04B 10/032; H04L 41/0604; H04L 41/0631;
(Continued)

(56) References Cited

U.S. PATENT DOCUMENTS 6,252,852 B1 *  6/2001  Rowles ................... H04L 43/00
                                                         370/242
7,843,840 B2   11/2010  Vankov et al.
(Continued)

FOREIGN PATENT DOCUMENTS

CN   103399852 A   11/2013
CN   103501512 A    1/2014
(Continued)

OTHER PUBLICATIONS

Huang Sida et al. On Clustering Algorithm of High D Im Ens Ional Data Based on S Im Ilarity M Easurem Ent, ComputerApp lications and Software, vol. 126 No. 9, Sep. 2009. total 8 pages. With partial English translation.

(Continued)

*Primary Examiner* — Jason D Recek
(74) *Attorney, Agent, or Firm* — Womble Bond Dickinson (US) LLP

(57) ABSTRACT

Embodiments of this application provide a service survivability analysis method and apparatus, and relate to the field of communications technologies, so as to shorten duration of service survivability analysis and improve efficiency of the service survivability analysis. The method includes: obtaining a link fault record and network topology information that are in a preset time period; determining a similarity between any two links in all faulty links based on fault occurrence time and fault removal time of the any two links in the link fault record and connection information of network devices on the any two links, to obtain a link similarity matrix; performing clustering on all the faulty links based on the link similarity matrix, to obtain at least one link cluster; and performing survivability analysis on services on at least two preset links based on each of the at least one link cluster.

17 Claims, 9 Drawing Sheets

(52) U.S. Cl.
CPC ............ *H04L 41/12* (2013.01); *H04L 41/147* (2013.01); *H04L 41/5019* (2013.01); *H04L 41/0604* (2013.01)

(58) Field of Classification Search
CPC ............ H04L 41/0677; H04L 41/0681; H04L 41/069; H04L 41/12; H04L 41/142; H04L 41/147; H04L 41/5019; H04L 41/06
See application file for complete search history.

(56) References Cited

U.S. PATENT DOCUMENTS

| | | | | |
|---|---|---|---|---|
| 10,142,353 | B2* | 11/2018 | Yadav | H04L 63/1408 |
| 2010/0138688 | A1* | 6/2010 | Sykes | H04L 41/147 714/4.1 |
| 2014/0006871 | A1 | 1/2014 | Lakshmanan et al. | |
| 2014/0016924 | A1 | 1/2014 | Gonzalez De Dios | |
| 2015/0033084 | A1 | 1/2015 | Sasturkar et al. | |
| 2016/0232254 | A1 | 8/2016 | Chehreghani | |
| 2016/0359592 | A1* | 12/2016 | Kulshreshtha | G06F 16/288 |
| 2017/0195240 | A1 | 7/2017 | Chen et al. | |
| 2017/0244601 | A1* | 8/2017 | Byers | H04L 43/0817 |

FOREIGN PATENT DOCUMENTS

| | | |
|---|---|---|
| CN | 103532761 A | 1/2014 |
| CN | 103843360 A | 6/2014 |
| CN | 105007183 A | 10/2015 |
| CN | 105187255 A | 12/2015 |
| CN | 105827472 A | 8/2016 |
| EP | 3062526 B1 | 8/2018 |
| WO | 2012138319 A1 | 10/2012 |

OTHER PUBLICATIONS

Jiaqi Zheng et al. We've Got You Covered: Failure Recovery with Backup Tunnels in Traffic Engineering, 2016 IEEE 24th International Conference on Network Protocols (ICNP), total 10 pages.

* cited by examiner

SERVICE SURVIVABILITY ANALYSIS METHOD AND APPARATUS

CROSS-REFERENCE TO RELATED APPLICATIONS

This application is a continuation of International Application No. PCT/CN2017/115040 filed on Dec. 7, 2017, which claims priority to Chinese Patent Application No. 201710035513.X, filed on Jan. 18, 2017. The disclosures of the aforementioned applications are hereby incorporated by reference in their entireties.

TECHNICAL FIELD

This application relates to the field of communications technologies, and in particular, to a service survivability analysis method and apparatus.

BACKGROUND

An optical transport network is an important way of transmitting massive volumes of data across different regions. However, due to impact of factors such as a component failure, a power outage, road construction, and extreme weather, a link fault, for example, an optical fiber cut often occurs in the optical transport network. The link fault severely affects transmission of network data, and timely troubleshooting and preventive service survivability analysis are vital for rectification and prevention of the link fault. A service survivability analysis refers to analyzing impact of a link fault on an existing service by simulating the link fault before the link fault occurs.

A service survivability analysis includes unitary service survivability analysis and full service survivability analysis. The unitary service survivability analysis means analyzing impact of a link fault on a service by simulating all single link faults or a combination of link faults on links of the service in a transmission network. The full service survivability analysis means analyzing impact of a link fault on services in an entire transmission network by simulating all single link faults or a combination of link faults in the transmission network.

Currently, for a full service survivability analysis, the impact of the link fault on the services in the entire transmission network is analyzed mainly by traversing all the link faults or the combination of the link faults in the transmission network. Because a large quantity of links exist in the transmission network, it takes a very long time to perform survivability analysis once. Particularly, for higher-order combinations of link faults, a quantity of the higher-order combinations increases super-exponentially with link data in the transmission network, and therefore survivability analysis cannot be completed within a limited time. For example, in a transmission network having only 20983 links, when 28 processors are used for parallel computing, time required for analysis by simulating link faults in pairwise combinations once is up to 5 hours and 28 minutes. Analysis efficiency is relatively low.

Therefore, how to shorten duration of the service survivability analysis and improve efficiency of the service survivability analysis is an urgent problem to be resolved currently.

SUMMARY

Embodiments of this application provide a service survivability analysis method and apparatus, thereby resolving a problem in the prior art that service survivability analysis is time-consuming and of low efficiency.

To achieve the foregoing objective, the following technical solutions are used in the embodiments of this application:

According to one aspect, a service survivability analysis method is provided, where the method includes: obtaining a link fault record and network topology information that are in a preset time period, where the link fault record includes fault occurrence time and fault removal time of all faulty links in at least two preset links in the preset time period, and the network topology information includes connection information of all network devices on all the faulty links; determining a similarity between any two links in all the faulty links based on fault occurrence time and fault removal time of the any two links in the link fault record and connection information of network devices on the any two links, to obtain a link similarity matrix; performing clustering on all the faulty links based on the link similarity matrix, to obtain at least one link cluster; and performing survivability analysis on services on the at least two preset links based on each of the at least one link cluster.

In one embodiment, the link similarity matrix is generated by using the link fault record and the network topology information; then, clustering is performed on all the faulty links based on the link similarity matrix, to obtain the at least one link cluster; and survivability analysis is performed on the services on the at least two preset links based on each of the at least one link cluster. It can be learned, from generating the link similarity matrix by using the link fault record and the network topology information, that the link similarity matrix is determined by finding out a law of links in time and space in this embodiment of this application. Therefore, during clustering analysis on all the faulty links based on the link similarity matrix, the clustering analysis may be performed only on links having a similarity in time and space, thereby avoiding a disadvantage in the prior art that all link faults or a combination of link faults in a transmission network need to be traversed during full service survivability analysis. This greatly reduces time and computing resource overheads required for the full service survivability analysis, and improves efficiency of the service survivability analysis.

In one embodiment, the determining a similarity between any two links in all the faulty links based on fault occurrence time and fault removal time of the any two links in the link fault record and connection information of network devices on the any two links, to obtain a link similarity matrix includes: determining fault duration of the any two links in all the faulty links based on the fault occurrence time and the fault removal time of the any two links in the link fault record; determining a similarity between the fault duration of the any two links based on the fault duration of the any two links, to obtain a fault duration-based link similarity matrix; determining a similarity between the any two links in relation to a network topology based on the connection information of the network devices on the any two links, to obtain a network topology-based link similarity matrix; determining a similarity between the any two links in relation to importance based on the connection information of the network devices on the any two links, to obtain an importance-based link similarity matrix; and generating the link similarity matrix based on the fault duration-based link similarity matrix, the network topology-based link similarity matrix, and the importance-based link similarity matrix.

This embodiment of this application provides a specific implementation of determining the link similarity matrix by finding out a law of links in time and space. A case in which similar links may be similar in terms of link fault duration is considered when the fault duration-based link similarity matrix is determined based on the fault duration of the any two links; a case in which similar links may be similar in terms of a network topology is considered when the network topology-based link similarity matrix is determined based on the connection information of the network devices on the any two links; and a case in which similar links may be similar in terms of importance to network connection is considered when the importance-based link similarity matrix is determined based on the connection information of the network devices on the any two links. Then, the link similarity matrix is generated based on the fault duration-based link similarity matrix, the network topology-based link similarity matrix, and the importance-based link similarity matrix, and a more accurate link similarity matrix can be obtained. Then, clustering analysis is performed based on the link similarity matrix, and this can further reduce a probability of performing combination analysis on links having no association relationship, and further improve efficiency of the service survivability analysis.

In one embodiment, the determining a similarity between the fault duration of the any two links based on the fault duration of the any two links, to obtain a fault duration-based link similarity matrix includes: determining, based on a first preset formula, the similarity between the fault duration of the any two links based on the fault duration of the any two links, to obtain the fault duration-based link similarity matrix, where the first preset formula includes:

$$S_{duration,ij} = \frac{|T_i \cap T_j|}{|T_i \cup T_j|}$$

where $S_{duration,ij}$ represents a similarity between fault duration of a link i and fault duration of a link j, $T_i$ represents fault duration of the link i, $T_j$ represents fault duration of the link j, $|T_i \cap T_j|$ represents an intersection of the fault duration of the link i and the fault duration of the link j, and $|T_i \cup T_j|$ represents a union of the fault duration of the link i and the fault duration of the link j.

This embodiment of this application provides a specific implementation of determining the similarity between the fault duration of the any two links based on the fault duration of the any two links. A similarity between the any two links in relation to time is obtained based on a ratio of an intersection of the fault duration of the any two links to a union of the fault duration of the any two links, and a more accurate fault duration-based link similarity matrix can be obtained, so that a more accurate link similarity matrix can be obtained. Further, this can improve accuracy of performing clustering based on the link similarity matrix, and can further reduce a probability of performing combination analysis on links having no association relationship, thereby improving efficiency of the service survivability analysis.

In one embodiment, the determining a similarity between the any two links in relation to a network topology based on the connection information of the network devices on the any two links, to obtain a network topology-based link similarity matrix includes: determining, based on a second preset formula, the similarity between the any two links in relation to a network topology based on the connection information of the network devices on the any two links, to obtain the network topology-based link similarity matrix, where the second preset formula includes:

$$S_{topology,ij} = \begin{cases} 1, & \text{if } L_{i,src} = L_{j,dst} \text{ and } L_{j,src} = L_{i,dst} \\ 1, & \text{if } L_{i,src} = L_{j,src} \text{ or } L_{i,dst} = L_{j,src} \\ 0, & \text{else} \end{cases}$$

where $S_{topology,ij}$ represents a similarity between the link i and the link j in relation to a network topology, $L_{i,src}$ represents a source end of the link i, $L_{i,dst}$ represents a destination end of the link i, $L_{j,src}$ represents a source end of the link j, and $L_{j,dst}$ represents a destination end of the link j.

This embodiment of this application provides a specific implementation of determining the similarity between the any two links in relation to a network topology based on the connection information of the network devices on the any two links. A physical environment factor is considered in $L_{i,src}=L_{j,dst}$ and $L_{j,src}=L_{i,dst}$, and a device factor is considered in $L_{i,src}=L_{j,src}$ or $L_{i,dst}=L_{j,src}$. Because impact of both the physical environment factor and the device factor on the link similarity is considered, the network topology-based link similarity matrix can be determined more accurately, and the link similarity matrix can be determined more accurately. Further, this can improve accuracy of performing clustering based on the link similarity matrix, and reduce a probability of performing combination analysis on links having a weak association, thereby improving efficiency of the service survivability analysis.

In one embodiment, the determining a similarity between the any two links in relation to importance based on the connection information of the network devices on the any two links, to obtain an importance-based link similarity matrix includes: determining, based on a third preset formula, the similarity between the any two links in relation to importance based on the connection information of the network devices on the any two links, to obtain the importance-based link similarity matrix, where the third preset formula includes:

$$S_{importance,ij} = \begin{cases} 1, & \text{if } L_i \in B_L \text{ and } L_j \in B_L \\ 0, & \text{else} \end{cases}$$

where $S_{importance,ij}$ represents a similarity between the link i and the link j in relation to importance, $L_i$ represents the link i, $L_j$ represents the link j, $B_L$ is a set of bridge links, and the bridge link set $B_L$ is determined based on the network topology information.

This embodiment of this application provides a specific implementation of determining the similarity between the any two links in relation to importance based on the connection information of the network devices on the any two links. A case in which the any two links are bridge links is considered in $L_i \in B_L$ and $L_j \in B_L$. Because impact of the bridge link on the link similarity is considered, the importance-based link similarity matrix can be determined more accurately, and the link similarity matrix can be determined more accurately. Further, this can improve accuracy of performing clustering based on the link similarity matrix, and reduce a probability of performing combination analysis on links having a weak association, thereby improving efficiency of the service survivability analysis.

In one embodiment, the generating the link similarity matrix based on the fault duration-based link similarity matrix, the network topology-based link similarity matrix, and the importance-based link similarity matrix includes:

generating, based on a fourth preset formula, the link similarity matrix based on the fault duration-based link similarity matrix, the network topology-based link similarity matrix, and the importance-based link similarity matrix, where the fourth preset formula includes:

$$S_{ij}=0.5\times(S_{duration,ij})^{(1-c\times S_{topology,ij})}+(S_{duration,ij})^{(1-c\times S_{importance,ij})}$$

where $S_{ij}$ represents a link similarity between the link i and the link j, $S_{duration,ij}$ represents the similarity between the fault duration of the link i and the fault duration of the link j, $S_{topology,ij}$ represents the similarity between the link i and the link j in relation to a network topology, $S_{importance,ij}$ represents the similarity between the link i and the link j in relation to importance, and C represents a degree of stretching, where $0<c<1$.

This embodiment of this application provides a specific implementation of generating the link similarity matrix based on the fault duration-based link similarity matrix, the network topology-based link similarity matrix, and the importance-based link similarity matrix. Based on the foregoing implementation, when both $S_{topology,ij}$ and $S_{importance,ij}$ are 0, there is no association between the similarity between the link i and the link j in relation to a network topology and the similarity between the link i and the link j in relation to importance, that is, there is no stretching. When both $S_{topology,ij}$ and $S_{importance,ij}$ are 1, the degree of stretching is related to c. A smaller value of c indicates a higher degree of stretching, which conforms to an actual network status. Therefore, a more accurate link similarity matrix can be obtained. Further, this improves accuracy of performing clustering based on the link similarity matrix, and reduces a probability of performing combination analysis on links having no association relationship, thereby improving efficiency of the service survivability analysis.

In one embodiment, the performing survivability analysis on services on the at least two preset links based on each of the at least one link cluster includes: performing an M-order combination on links in each of the at least one link cluster, to obtain a combination result of links in each link cluster, where M is a positive integer; and performing survivability analysis on the services on the at least two preset links based on the combination result of the links in each link cluster. According to the service survivability analysis method provided in this embodiment of this application, due to a relatively strong association between links in each link cluster, a higher-order combination is performed on links in the at least one link cluster, and this can reduce a probability of performing combination on links having no association relationship, and reduce time used for service survivability analysis on links of higher-order combinations, thereby improving efficiency of the service survivability analysis.

According to another aspect, a service survivability analysis apparatus is provided, where the apparatus includes: a collection module, a link similarity matrix computing module, a link clustering module, and a service survivability analysis module, where the collection module is configured to obtain a link fault record and network topology information that are in a preset time period, where the link fault record includes fault occurrence time and fault removal time of all faulty links in at least two preset links in the preset time period, and the network topology information includes connection information of all network devices on all the faulty links; the link similarity matrix computing module is configured to determine a similarity between any two links in all the faulty links based on fault occurrence time and fault removal time of the any two links in the link fault record and connection information of network devices on the any two links, to obtain a link similarity matrix; the link clustering module is configured to perform clustering on all the faulty links based on the link similarity matrix, to obtain at least one link cluster; and the service survivability analysis module is configured to perform survivability analysis on services on the at least two preset links based on each of the at least one link cluster.

In one embodiment, the link similarity matrix computing module is configured to: determine fault duration of the any two links in all the faulty links based on the fault occurrence time and the fault removal time of the any two links in the link fault record; determine a similarity between the fault duration of the any two links based on the fault duration of the any two links, to obtain a fault duration-based link similarity matrix; determine a similarity between the any two links in relation to a network topology based on the connection information of the network devices on the any two links, to obtain a network topology-based link similarity matrix; determine a similarity between the any two links in relation to importance based on the connection information of the network devices on the any two links, to obtain an importance-based link similarity matrix; and generate the link similarity matrix based on the fault duration-based link similarity matrix, the network topology-based link similarity matrix, and the importance-based link similarity matrix.

In one embodiment, the link similarity matrix computing module is configured to: determine, based on a first preset formula, the similarity between the fault duration of the any two links based on the fault duration of the any two links, to obtain the fault duration-based link similarity matrix, where the first preset formula includes:

$$S_{duration,ij} = \frac{|T_i \cap T_j|}{|T_i \cup T_j|}$$

where $S_{duration,ij}$ represents a similarity between fault duration of a link i and fault duration of a link j, $T_i$ represents fault duration of the link i, $T_j$ represents fault duration of the link j, $|T_i \cap T_j|$ represents an intersection of the fault duration of the link i and the fault duration of the link j, and $|T_i \cup T_j|$ represents a union of the fault duration of the link i and the fault duration of the link j.

In one embodiment, the link similarity matrix computing module is configured to: determine, based on a second preset formula, the similarity between the any two links in relation to a network topology based on the connection information of the network devices on the any two links, to obtain the network topology-based link similarity matrix, where the second preset formula includes:

$$S_{topology,ij} = \begin{cases} 1, & \text{if } L_{i,src} = L_{j,dst} \text{ and } L_{j,src} = L_{i,dst} \\ 1, & \text{if } L_{i,src} = L_{j,src} \text{ or } L_{i,dst} = L_{j,src} \\ 0, & \text{else} \end{cases}$$

where $S_{topology,ij}$ represents a similarity between the link i and the link j in relation to a network topology, $L_{i,src}$ represents a source end of the link $L_{i,dst}$ represents a destination end of the link i, $L_{j,src}$ represents a source end of the link j, and $L_{j,dst}$ represents a destination end of the link j.

In one embodiment, the link similarity matrix computing module is configured to: determine, based on a third preset formula, the similarity between the any two links in relation to importance based on the connection information of the network devices on the any two links, to obtain the importance-based link similarity matrix, where the third preset formula includes:

$$S_{importance,ij} = \begin{cases} 1, & \text{if } L_i \in B_L \text{ and } L_j \in B_L \\ 0, & \text{else} \end{cases}$$

where $S_{importance,ij}$ represents a similarity between the link i and the link j in relation to importance, $L_i$ represents the link i, $L_j$ represents the link $B_L$ is a set of bridge links, and the bridge link set $B_L$ is determined based on the network topology information.

In one embodiment, the link similarity matrix computing module is configured to: generate, based on a fourth preset formula, the link similarity matrix based on the fault duration-based link similarity matrix, the network topology-based link similarity matrix, and the importance-based link similarity matrix, where the fourth preset formula includes:

$$S_{ij} = 0.5 \times (S_{duration,ij})^{(1-c \times S_{topology,ij})} + (S_{duration,ij})^{(1-c \times S_{importance,ij})}$$

where $S_{ij}$ represents a link similarity between the link i and the link j, $S_{duration,ij}$ represents the similarity between the fault duration of the link i and the fault duration of the link j, $S_{topology,ij}$ represents the similarity between the link i and the link J in relation to a network topology, $S_{importance,ij}$ represents the similarity between the link i and the link j in relation to importance, and c represents a degree of stretching, where $0 < c < 1$.

In one embodiment, the service survivability analysis module is configured to: perform an M-order combination on links in each of the at least one link cluster, to obtain a link combination result in each link cluster, where M is a positive integer; and perform survivability analysis on the services on the at least two preset links based on the link combination result in each link cluster.

According to still another aspect, an embodiment of this application provides a service survivability analysis apparatus, including a processor, a memory, and a communications interface, where the memory is configured to store a computer executable instruction, and when the service survivability analysis apparatus runs, the processor executes the computer executable instruction stored in the memory, so that the service survivability analysis apparatus executes any one of the foregoing service survivability analysis methods.

According to yet another aspect, a computer readable storage medium is provided, including a computer instruction, where when the computer instruction runs on a service survivability analysis apparatus, the service survivability analysis apparatus executes any one of the foregoing service survivability analysis methods.

According to still yet another aspect, a computer program product including a computer instruction is provided, where when the computer program product runs on a service survivability analysis apparatus, the service survivability analysis apparatus executes any one of the foregoing service survivability analysis methods.

In addition, for technical effects brought by any design manner in the foregoing embodiment of the service survivability analysis apparatus, refer to technical effects brought by different design manners in the foregoing embodiment of the service survivability analysis method. Details are not described herein again.

These aspects or other aspects of this application are clearer and easier to understand in the description of the following embodiments.

DESCRIPTION OF EMBODIMENTS

It should be noted that, "/" in this specification represents "or". For example, A/B may represent A or B; the term "and/or" in this specification describes only an association relationship for describing associated objects and represents that three relationships may exist. For example, A and/or B may represent the following three cases: Only A exists, both A and B exist, and only B exists. "Plurality of" means two or more than two.

Terms such as "component", "module", and "system" used in this application are used to indicate computer-related entities. The computer-related entities may be hardware, firmware, combinations of hardware and software, software, or running software. For example, a component may be, but is not limited to, a process that runs on a processor, a processor, an object, an executable file, a thread of execution, a program, and/or a computer. In an example, both a computing device and an application that runs on the computing device may be components. One or more components may reside within a process and/or a thread of execution, and a component may be located on one computer and/or distributed between two or more computers. In addition, these components can be executed in various computer-readable media that have various data structures. These components may perform communication in a manner of local and/or remote process by using a signal that has one or more data packets (such as data from one component, the component performs interaction with another component in a local system or a distributed system; and/or performs interaction with another system in a manner of a signal by using a network such as the internet).

It should be noted that, in the embodiments of this application, words such as "exemplary" or "for example" are used as an example, an illustration, or a description. Any embodiment or design scheme that is described as "exemplary" or "for example" in the embodiments of this application should not be construed as more preferable or more advantageous than another embodiment or design scheme. Or rather, a word such as "exemplary" or "for example" is used to present a related concept in a specific manner.

It should be noted that, in the embodiments of this application, "of (of)", "relevant (corresponding, relevant)", and "corresponding (corresponding)" may sometimes be used interchangeably. It should be noted that, with no emphasis on a difference between "of", "relevant", and "corresponding", meanings expressed are consistent.

Figure 1:
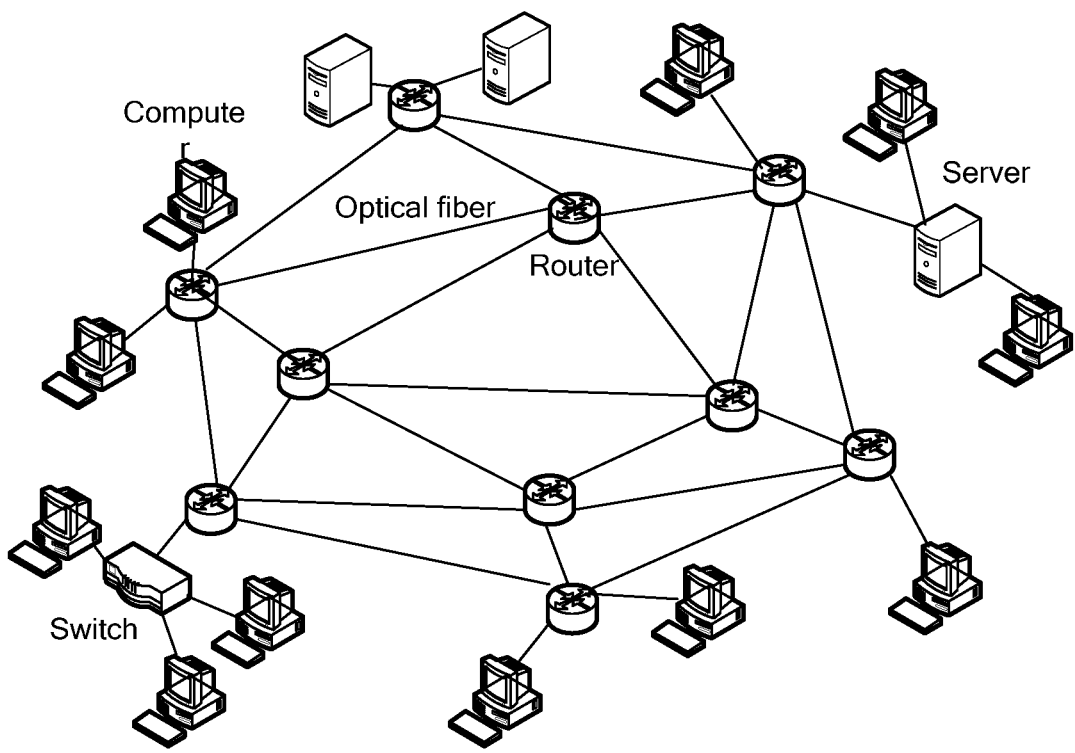
FIG. 1 is a schematic architectural diagram of a transmission network according to an embodiment of this application.

FIG. 1 is a schematic architectural diagram of a transmission network according to an embodiment of this application. The transmission network includes: a network device and a link that connects different network devices. The network device includes: a router, a switch, a server, a computer, and/or the like. The link connecting different network devices includes: an optical fiber, a coaxial cable, a twisted pair cable, and/or the like. The network device is used to forward and/or process service data, and the link is used to transmit the service data.

Figure 2:
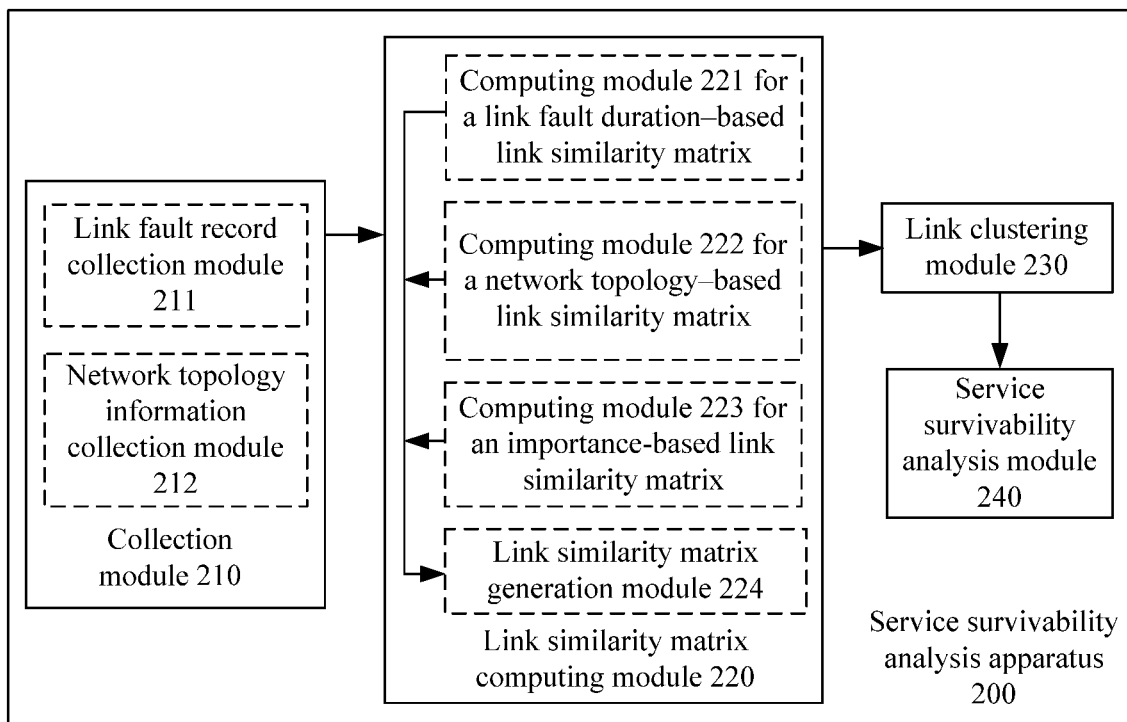
FIG. 2 is a schematic structural diagram of a service survivability analysis apparatus according to an embodiment of this application.

FIG. 2 is a schematic structural diagram of a service survivability analysis apparatus according to an embodiment of this application. The service survivability analysis apparatus 200 includes: a collection module 210, a link similarity matrix computing module 220, a link clustering module 230, and a service survivability analysis module 240. Optionally, the collection module 210 includes: a link fault record collection module 211 and a network topology information collection module 212. The link similarity matrix computing module 220 includes: a computing module 221 for a link fault duration-based link similarity matrix, a computing module 222 for a network topology-based link similarity, a computing module 223 for an importance-based link similarity matrix, and a link similarity matrix generation module 224.

The following describes each module in the service survivability analysis apparatus in detail.

The link fault record collection module 211 is mainly responsible for periodically collecting a link fault record in the transmission network.

Historical data in the link fault record is an important basis of data mining for a link fault. In this embodiment of this application, the link fault record may include the following parameters:

an alarm source (Alarm Source): mainly describing site information of a receive end connected by a link on which an alarm occurs;

location information (Location Information): mainly describing a specific device number, a slot number, and a port number of a site of a link on which an alarm occurs;

an alarm name (Alarm Name): several different types of alarms occur on a link, for example, an alarm warning that a transmission rate of a link is lower than a threshold, an alarm warning that transmission noise of a link is higher than a threshold, or a link fault alarm; the link fault record in this embodiment of this application mainly describes an alarm of a link fault, and focuses on only the link fault alarm, for example, a link break or a link disconnection;

an alarm level (Alarm Level): mainly describing a severity level of a link fault alarm, where there are three severity levels: minor, major, and critical;

occur time (Occur Time): mainly describing time at which a link fault alarm occurs; and clear time (Clear Time): mainly describing time at which a link fault alarm is cleared.

The network topology information collection module 212 is mainly responsible for periodically collecting network topology information in the transmission network. The network topology information includes connection information of all network devices (for example, a switch and a router) on all faulty links.

Figure 3:
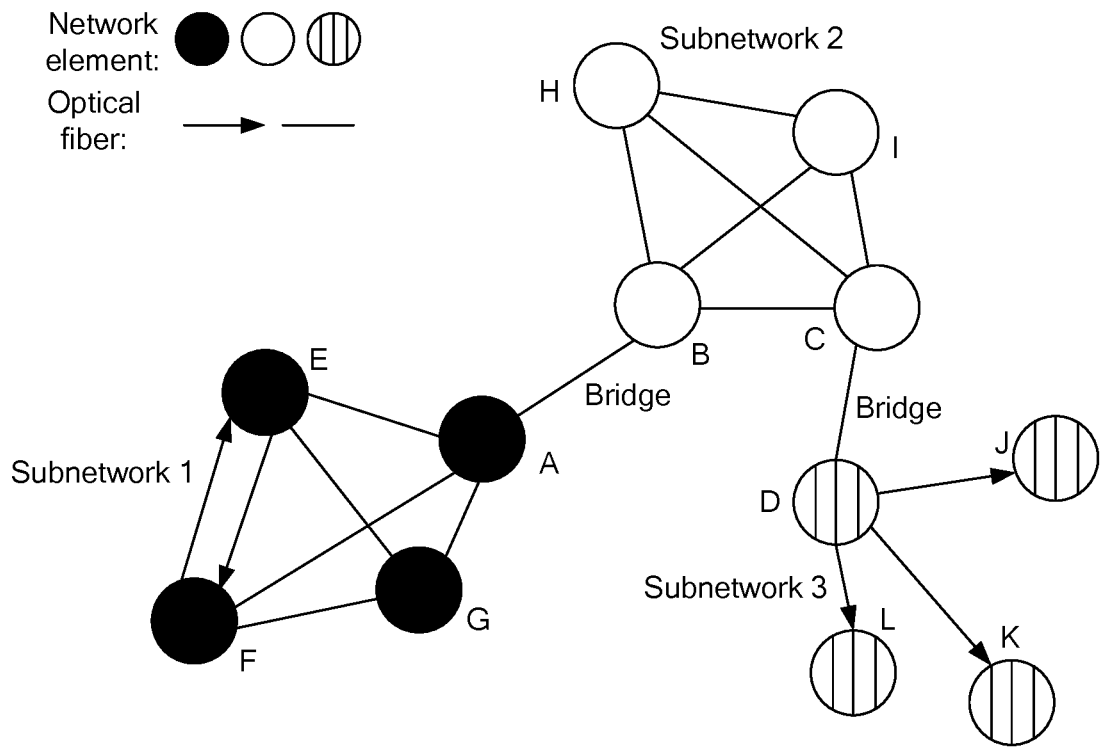
FIG. 3 is a schematic diagram of a network topology according to an embodiment of this application.

For example, FIG. 3 is a schematic diagram of a network topology according to an embodiment of this application. The network topology includes three subnetworks: a subnetwork 1, a subnetwork 2, and a subnetwork 3. The subnetwork 1 includes four network devices: a network device A, a network device E, a network device F, and a network device G. Any two network devices are connected by a link, and two links between the network device E and the network device F are paired links. The subnetwork 2 includes four network devices: a network device B, a network device C, a network device 1, and a network device H. Any two network devices are connected by a link, and a link between the network device B of the subnetwork 2 and the network device A of the subnetwork 1 is an only path between the subnetwork 2 and the subnetwork 1 and is referred to as a bridge link. The subnetwork 3 includes four network devices: a network device D, a network device L, a network device J, and a network device K. The network device J, the network device K, and the network device L that are in the subnetwork 3 and the network device C in the subnetwork 2 are network devices connected to the source device D.

The link similarity matrix computing module 220 is mainly responsible for determining a similarity between any two links in the link fault record based on the link fault record collected periodically by the link fault record collection module 211 and the network topology information collected periodically by the network topology information collection module 212, to obtain a link similarity matrix.

The computing module 221 for a link fault duration-based link similarity matrix is mainly configured to: determine fault duration of the any two links in all the faulty links based on fault occurrence time and fault removal time of the any two links in the link fault record; and determine a similarity between the fault duration of the any two links based on the fault duration of the any two links, to obtain a fault duration-based link similarity matrix.

The computing module 222 for a network topology-based link similarity matrix is mainly configured to determine a similarity between the any two links in all the faulty links in relation to a network topology based on connection information of network devices on the any two links in the link fault record, to obtain a network topology-based link similarity matrix.

The computing module 223 for an importance-based link similarity matrix is mainly configured to determine a similarity between the any two links in all the faulty links in relation to importance based on the connection information of the network devices on the any two links in the link fault record, to obtain an importance-based link similarity matrix.

The link similarity matrix generation module 224 is mainly configured to generate the link similarity matrix based on the foregoing link fault duration-based link similarity matrix, the network topology-based link similarity matrix, and the importance-based link similarity matrix.

A manner of determining the similarity between the fault duration of the any two links, a manner of determining the similarity between the any two links in relation to a network topology, a manner of determining the similarity between the any two links in relation to importance, and a manner of generating the link similarity matrix are described in detail in the following method embodiment, and details are not described herein.

The link clustering module 230 is mainly configured to perform clustering on all the faulty links in the link fault record based on the link similarity matrix, to obtain at least one link cluster.

A specific clustering manner is described in the following method embodiment, and details are not described herein.

The service survivability analysis module 240 is mainly configured to perform survivability analysis on services on at least two preset links based on each of the at least one link cluster obtained by clustering by the link clustering module 230.

Figure 4:
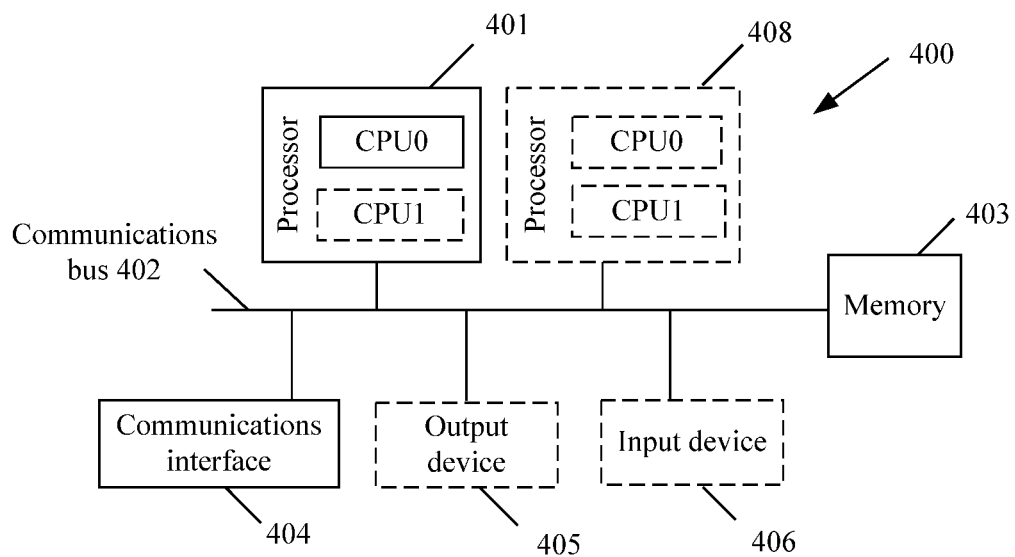
FIG. 4 is a schematic diagram of a computer device according to an embodiment of this application.

As shown in FIG. 4, the service survivability analysis apparatus in this embodiment of this application may be implemented by a computer device (or system) in FIG. 4.

FIG. 4 is a schematic diagram of a computer device according to an embodiment of this application. The computer device 400 includes at least one processor 401, a communications bus 402, a memory 403, and at least one communications interface 404.

The processor 401 may be a general-purpose central processing unit (CPU), a microprocessor, an application-specific integrated circuit (ASIC), or one or more integrated circuits configured to control program execution in solutions of this application.

The communications bus 402 may include one channel, to transfer information between the foregoing components.

The communications interface 404 uses any apparatus such as a transceiver to communicate with another device or communications network, for example, Ethernet, a radio access network (RAN), and a wireless local area network (WLAN).

The memory 403 may be a read-only memory (ROM), or another type of static storage device capable of storing static information and an instruction, or a random access memory (RAM), or another type of dynamic storage device capable of storing information and an instruction, or may be an electrically erasable programmable read-only memory (EEPROM), a compact disc read-only memory (CD-ROM), or another compact disc storage, optical disc storage (including a compact disc, a laser disc, an optical disc, a digital versatile disc, a Blu-ray disc, and the like), or magnetic disk storage medium or another magnetic storage device, or any other medium that can carry or store expected program code having an instruction or data structure form and can be accessed by a computer, but this is not limited herein. The memory may exist independently, and is connected to the processor by using a bus. Alternatively, the memory may be integrated with the processor.

The memory 403 is configured to store application program code used to execute the solutions of this application, and the execution is controlled by the processor 401. The processor 401 is configured to execute the application program code stored in the memory 403, to implement the service survivability analysis method in this embodiment of this application.

During specific implementation, in an embodiment, the processor 401 may include one or more CPUs, such as CPU0 and CPU1 in FIG. 4.

During specific implementation, in an embodiment, the computer device 400 may include a plurality of processors, such as the processor 401 and a processor 408 in FIG. 4. Each of these processors may be a single-CPU processor, or may be a multi-CPU processor. The processor herein may be one or more devices, circuits, and/or processor cores that are used to process data (for example, a computer program instruction).

During specific implementation, in an embodiment, the computer device 400 may further include an output device 405 and an input device 406. The output device 405 communicates with the processor 401, and may display information in a plurality of manners. For example, the output device 405 may be a liquid crystal display (LCD), a light emitting diode (LED) display device, a cathode ray tube (CRT) display device, or a projector. The input device 406 communicates with the processor 401, and may receive an input of a user in a plurality of manners. For example, the input device 406 may be a mouse, a keyboard, a touchscreen device, or a sensor device.

The computer device 400 may be a general-purpose computer device, or a special-purpose computer device. During specific implementation, the computer device 400 may be a desktop computer, a portable computer, a network server, a personal digital assistant (PDA), a mobile phone, a tablet computer, a wireless terminal device, a communications device, an embedded device, or a device with a structure similar to that in FIG. 4. This embodiment of this application sets no limitation to a type of the computer device 400.

Figure 5:
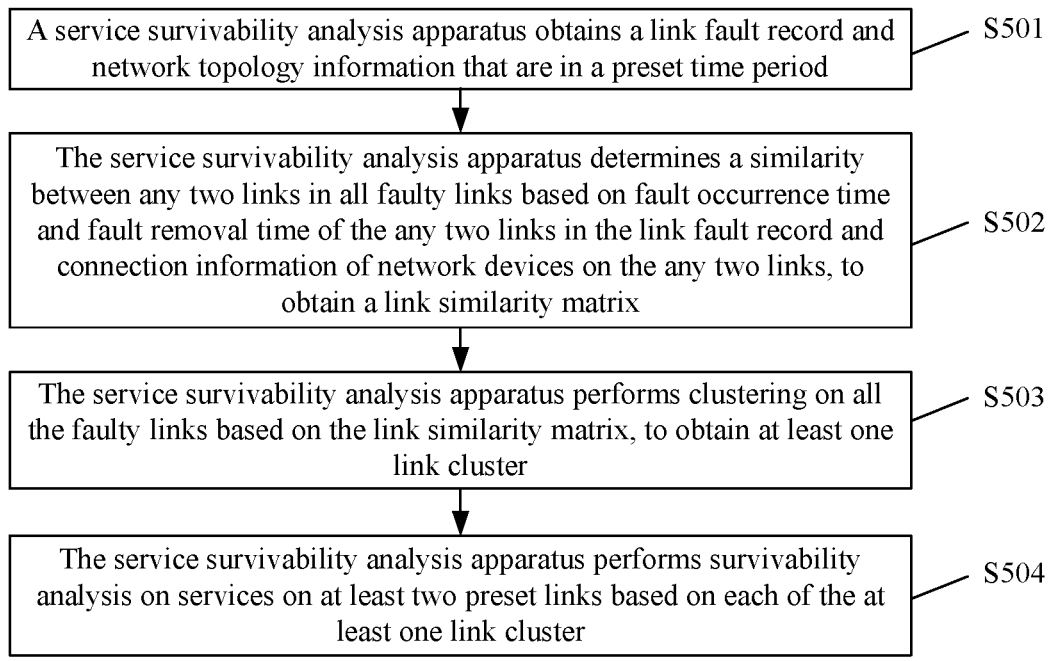
FIG. 5 is a schematic flowchart of a service survivability analysis method according to an embodiment of this application.

FIG. 5 is a schematic flowchart of a service survivability analysis method according to an embodiment of this application. The method includes operation S501 to operation S504.

Operation S501: A service survivability analysis apparatus obtains a link fault record and network topology information that are in a preset time period.

The link fault record includes fault occurrence time and fault removal time of all faulty links in at least two preset links in the preset time period, and the network topology information includes connection information of all network devices on all the faulty links.

It should be noted that, the at least two preset links in this embodiment of this application may be all links in an entire transmission network, or may be links of a service, or may be links defined by a user depending on another requirement. This is not limited in this embodiment of this application.

In one embodiment, with reference to FIG. 2, the collection module 210 in the service survivability analysis apparatus 200 is configured to enable the service survivability analysis apparatus 200 to perform operation S501 in this embodiment of this application.

Operation S502: The service survivability analysis apparatus determines a similarity between any two links in all faulty links based on fault occurrence time and fault removal time of the any two links in the link fault record and connection information of network devices on the any two links, to obtain a link similarity matrix.

Considering that a plurality of links may become faulty at the same time for some reasons in the transmission network, the similarity between the any two links may be determined by analyzing the link fault record and the network topology information.

In one embodiment, with reference to FIG. 2, the link similarity matrix computing module 220 in the service survivability analysis apparatus 200 is configured to enable the service survivability analysis apparatus 200 to perform step S502 in this embodiment of this application.

Operation S503: The service survivability analysis apparatus performs clustering on all the faulty links based on the link similarity matrix, to obtain at least one link cluster.

In one embodiment, clustering is implemented by using a clustering algorithm. The clustering algorithm in this embodiment of this application needs to have the following characteristics:

A quantity of faulty link clusters in a dynamically changing transmission network cannot be obtained in advance, and therefore, in the dynamically changing transmission network, the clustering algorithm is required to be free from a need to preset a clustering quantity.

Because the transmission network is huge and obtaining absolute location coordinates of all faults has low efficiency, the clustering algorithm is required to be free from a need of absolute location coordinates of a feature. For example, only a relative distance between features is needed. For example, the relative distance may be a link similarity.

Because many link faults in the transmission network exist independently and do not belong to any link cluster, the clustering algorithm is required to allow existence of noise, so that these independently existing fault links are considered as noise points and are not classified into any link cluster.

In one embodiment, the clustering algorithm applied to this embodiment of this application may be a spectral clustering algorithm, or may be an algorithm of density-based spatial clustering of applications with noise (Density-Based Spatial Clustering of Applications with Noise, DBSCAN). This is not limited in this embodiment of this application.

In one embodiment, with reference to FIG. 2, the link clustering module 230 in the service survivability analysis apparatus 200 is configured to enable the service survivability analysis apparatus 200 to perform step S503 in this embodiment of this application.

Operation S504: The service survivability analysis apparatus performs survivability analysis on services on at least two preset links based on each of the at least one link cluster.

In one embodiment, that the service survivability analysis apparatus performs survivability analysis on services on at least two preset links based on each of the at least one link cluster may include the following:

When the at least two preset links are links of a service, unitary service survivability analysis may be performed based on each of the at least one link cluster; when the at least two preset links are all links in the entire transmission network, full service survivability analysis may be performed based on each of the at least one link cluster; or when the at least two preset links are user-defined links, survivability analysis may be performed on services on the user-defined links based on each of the at least one link cluster. This is not limited in this embodiment of this application.

In one embodiment, with reference to FIG. 2, the service survivability analysis module 240 in the service survivability analysis apparatus 200 is configured to enable the service survivability analysis apparatus 200 to perform step S504 in this embodiment of this application.

In the service survivability analysis method provided in this embodiment of this application, the link similarity matrix is generated by using the link fault record and the network topology information; then, clustering is performed on all the faulty links based on the link similarity matrix, to obtain the at least one link cluster; and survivability analysis is performed on the services on the at least two preset links based on each of the at least one link cluster. It can be learned, from generating the link similarity matrix by using the link fault record and the network topology information, that the link similarity matrix is determined by finding out a law of links in time and space in this embodiment of this application. Therefore, during clustering analysis on all the faulty links based on the link similarity matrix, the clustering analysis may be performed only on links having a similarity in time and space, thereby avoiding a disadvantage in the prior art that all link faults or a combination of link faults in a transmission network need to be traversed during full service survivability analysis. This greatly reduces time and computing resource overheads required for the full service survivability analysis, and improves efficiency of the service survivability analysis.

Figure 6:
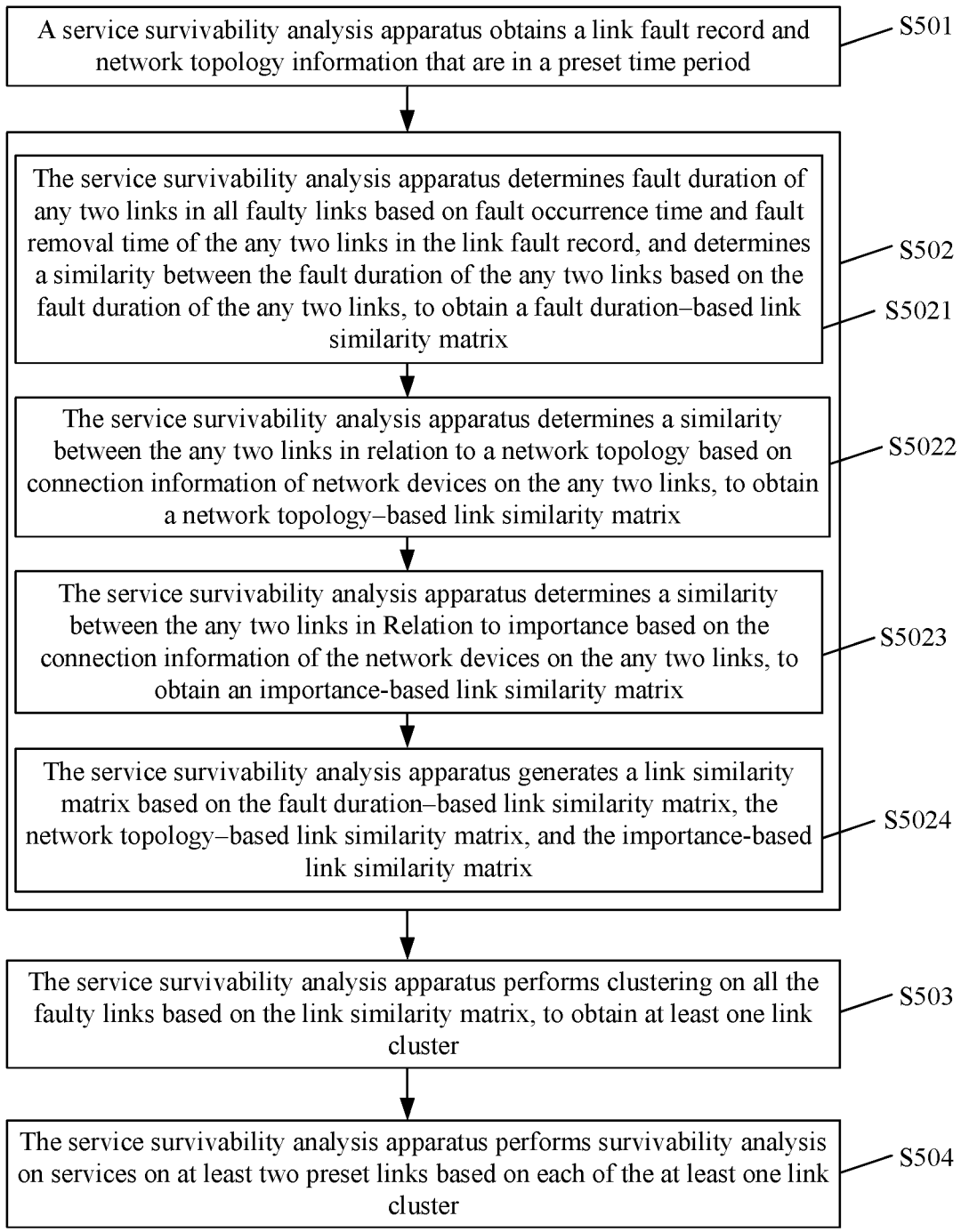
FIG. 6 is a schematic flowchart of another service survivability analysis method according to an embodiment of this application.

In one embodiment, as shown in FIG. 6, operation S502 includes operation S5021 to operation S5024.

Operation S5021: The service survivability analysis apparatus determines fault duration of the any two links in all the faulty links based on the fault occurrence time and the fault removal time of the any two links in the link fault record, and determines a similarity between the fault duration of the any two links based on the fault duration of the any two links, to obtain a fault duration-based link similarity matrix.

In one embodiment, with reference to FIG. 2, the computing module 221 for a link fault duration-based link similarity matrix in the service survivability analysis apparatus 200 is configured to enable the service survivability analysis apparatus 200 to perform operation S5021 in this embodiment of this application.

Operation S5022: The service survivability analysis apparatus determines a similarity between the any two links in relation to a network topology based on the connection information of the network devices on the any two links, to obtain a network topology-based link similarity matrix.

In one embodiment, with reference to FIG. 2, the computing module 222 for a link similarity based on a network topology in the service survivability analysis apparatus 200 is configured to enable the service survivability analysis apparatus 200 to perform operation S5022 in this embodiment of this application.

Operation S5023: The service survivability analysis apparatus determines a similarity between the any two links in relation to importance based on the connection information of the network devices on the any two links, to obtain an importance-based link similarity matrix.

In one embodiment, with reference to FIG. 2, the computing module 223 for an importance-based link similarity matrix in the service survivability analysis apparatus 200 is configured to enable the service survivability analysis apparatus 200 to perform operation S5023 in this embodiment of this application.

Operation S5024: The service survivability analysis apparatus generates the link similarity matrix based on the fault duration-based link similarity matrix, the network topology-based link similarity matrix, and the importance-based link similarity matrix.

In one embodiment, with reference to FIG. 2, the link similarity matrix generation module 224 in the service survivability analysis apparatus 200 is configured to enable the service survivability analysis apparatus 200 to perform operation S5024 in this embodiment of this application.

It should be noted that, in the embodiment shown in FIG. 6, the fault duration of the links in operation S5021 reflects only a link fault association in relation to time. However, two links may overlap in fault duration by chance, but have no relationship at all. Therefore, in this embodiment of this application, the link similarity may be improved based on locations of the links at a network topology layer in operation S5022. In addition, considering that many links are very important to network connection at the network topology layer, in this embodiment of this application, the link similarity may be further improved based on importance of the links to the network connection in operation S5023. Finally, a more accurate link similarity matrix may be obtained by combining the similarity in relation to time and the similarity in relation to a network topology in operation S5024. Then, clustering analysis is performed based on the link similarity matrix, and this can further reduce a probability of performing combination analysis on links having no association relationship, and further improve efficiency of the service survivability analysis.

In conclusion, this embodiment of this application provides a specific implementation of determining the link similarity matrix by finding out a law of links in time and space. A case in which similar links may be similar in terms of link fault duration is considered when the fault duration-based link similarity matrix is determined based on the fault duration of the any two links; a case in which similar links may be similar in terms of a network topology is considered when the network topology-based link similarity matrix is determined based on the connection information of the network devices on the any two links; and a case in which similar links may be similar in terms of importance to network connection is considered when the importance-based link similarity matrix is determined based on the connection information of the network devices on the any two links. Then, the link similarity matrix is generated based on the fault duration-based link similarity matrix, the network topology-based link similarity matrix, and the importance-based link similarity matrix, and a more accurate link similarity matrix can be obtained. Then, clustering analysis is performed based on the link similarity matrix, and this can further reduce a probability of performing combination analysis on links having no association relationship, and further improve efficiency of the service survivability analysis.

In one embodiment, operation S5021 includes: determining, by the service survivability analysis apparatus, the fault duration of the any two links in all the faulty links based on the fault occurrence time and the fault removal time of the any two links in the link fault record; and then, determining, based on formula (1), the similarity between the fault duration of the any two links based on the fault duration of the any two links, to obtain the fault duration-based link similarity matrix:

$$S_{duration,ij} = \frac{|T_i \cap T_j|}{|T_i \cup T_j|} \quad \text{Formula (1)}$$

where $S_{duration,ij}$ represents a similarity between fault duration of a link i and fault duration of a link j, $T_i$ represents fault duration of the link i, $T_j$ represents fault duration of the link j, $|T_i \cap T_j|$ represents an intersection of the fault duration of the link i and the fault duration of the link i, and $|T_i \cup T_j|$ represents a union of the fault duration of the link i and the fault duration of the link j.

Figure 7:
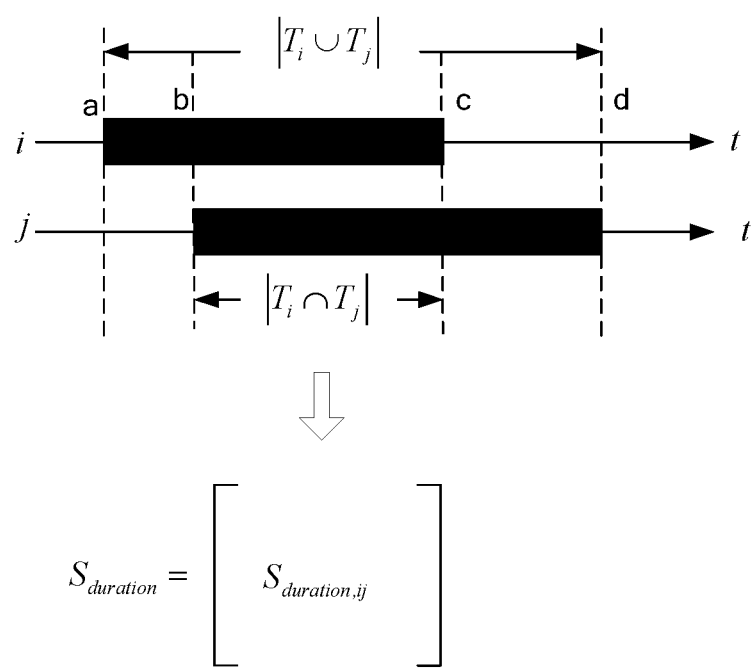
FIG. 7 is a schematic diagram of determining a fault duration-based link similarity matrix according to an embodiment of this application.

For example, as shown in FIG. 7, assuming that the fault duration of the link i corresponds to a segment ac on a time axis in a preset time period, and the fault duration of the link j corresponds to a segment bd on the time axis in the preset time period, an intersection of the fault duration of the link i and the fault duration of the link j is a segment bc, and a union of the fault duration of the link i and the fault duration of the link j is a segment ad. Further, the similarity between the fault duration of the link i and the fault duration of the link j may be obtained through calculation based on formula (1).

In conclusion, this embodiment of this application provides a specific implementation of determining the similarity between the fault duration of the any two links based on the fault duration of the any two links. A similarity between the any two links in relation to time is obtained based on a ratio of an intersection of the fault duration of the any two links to a union of the fault duration of the any two links, and a more accurate fault duration-based link similarity matrix can be obtained, so that a more accurate link similarity matrix can be obtained. Further, this can improve accuracy of performing clustering based on the link similarity matrix, and can further reduce a probability of performing combination analysis on links having no association relationship, thereby improving efficiency of the service survivability analysis.

In one embodiment, operation S5022 includes: determining, by the service survivability analysis apparatus, based on formula (2), the similarity between the any two links in relation to a network topology based on the connection information of the network devices on the any two links, to obtain the network topology-based link similarity matrix:

$$S_{topology,ij} = \begin{cases} 1, & \text{if } L_{i,src} = L_{j,dst} \text{ and } L_{j,src} = L_{i,dst} \\ 1, & \text{if } L_{i,src} = L_{j,src} \text{ or } L_{i,dst} = L_{j,src} \\ 0, & \text{else} \end{cases} \quad \text{Formula (2)}$$

where $S_{topology,ij}$ represents a similarity between the link i and the link j in relation to a network topology, $L_{i,src}$ represents a source end of the link i $L_{i,dst}$ represents a destination end of the link i, $L_{j,src}$ represents a source end of the link j, and $L_{j,dst}$ represents a destination end of the link j.

Considering that a physical environment factor may cause a link fault, for example, a link fault caused by an optical fiber cut during road construction, and optical fibers often exist in pairs, a paired optical fiber cut phenomenon often occurs, that is, two corresponding links become faulty. Therefore, when the similarity between the any two links in relation to a network topology is determined by using formula (2), the physical environment factor is considered, where $L_{i,src}=L_{j,dst}$ and $L_{j,src}=L_{i,dst}$ represents that two links occur in pairs. In addition, a device factor may cause a link fault. For example, if a source device or a destination device becomes faulty, links connected to the source device or to the destination device may have a fault indicating that transmit power is beyond a detected threshold range. That is, the links connected to the source device or to the destination device usually become faulty at the same time. Therefore, when the similarity between the any two links in relation to a network topology is determined by using formula (2), the device factor is also considered, where $L_{i,src}=L_{j,src}$ or $L_{i,dst}=L_{j,src}$ represents that the links are connected to a same source end or a same destination end.

In conclusion, this embodiment of this application provides a specific implementation of determining the similarity between the any two links in relation to a network topology based on the connection information of the network devices on the any two links. The physical environment factor is considered in $L_{i,src}=L_{j,dst}$ and $L_{j,src}=L_{i,dst}$, and the device factor is considered in $L_{i,src}=L_{j,src}$ or $L_{i,dst}=L_{j,src}$. Because impact of both the physical environment factor and the device factor on the link similarity is considered, the network topology-based link similarity matrix can be determined more accurately, and the link similarity matrix can be determined more accurately. Further, this can improve accuracy of performing clustering based on the link similarity matrix, and reduce a probability of performing combination analysis on links having a weak association, thereby improving efficiency of the service survivability analysis.

In one embodiment, operation S5023 includes: determining, by the service survivability analysis apparatus, based on formula (3), the similarity between the any two links in relation to importance based on the connection information of the network devices on the any two links, to obtain the importance-based link similarity matrix:

$$S_{importance,ij} = \begin{cases} 1, & \text{if } L_i \in B_L \text{ and } L_j \in B_L \\ 0, & \text{else} \end{cases} \quad \text{Formula (3)}$$

where $S_{importance,ij}$ represents a similarity between the link i and the link j in relation to importance, $L_i$ represents the link i, $L_j$ represents the link j, $B_L$ is a set of bridge links, and the bridge link set $B_L$ is determined based on the network topology information.

In one embodiment, the set $B_L$ of all the bridge links in the transmission network may be obtained based on the network topology information and an existing network topology bridge discovery algorithm.

It should be noted that, a bridge link is an only path connecting different subnetworks in the transmission network. If the link becomes faulty, traffic between the subnetworks is interrupted.

In conclusion, this embodiment of this application provides a specific implementation of determining the similarity between the any two links in relation to importance based on the connection information of the network devices on the any two links. A case in which the any two links are bridge links is considered in $L_i \in B_L$ and $L_j \in B_L$. Because impact of the bridge link on the link similarity is considered, the importance-based link similarity matrix can be determined more accurately, and the link similarity matrix can be determined more accurately. Further, this can improve accuracy of performing clustering based on the link similarity matrix, and reduce a probability of performing combination analysis on links having a weak association, thereby improving efficiency of the service survivability analysis.

In one embodiment, operation S5024 includes: generating, by the service survivability analysis apparatus, based on formula (4), the link similarity matrix based on the fault duration-based link similarity matrix, the network topology-based link similarity matrix, and the importance-based link similarity matrix:

$$S_{ij}=0.5\times(S_{duration,ij})^{(1-c\times S_{topology,ij})}+ (S_{duration,ij})^{(1-c\times S_{importance,ij})} \quad \text{Formula (4)}$$

where $S_{ij}$ represents a link similarity between the link i and the link j, $S_{duration,ij}$ represents the similarity between the fault duration of the link i and the fault duration of the link j, $S_{topology,ij}$ represents the similarity between the link i and the link j in relation to a network topology, $S_{importance,ij}$ represents the similarity between the link i and the link j in relation to importance, and c represents a degree of stretching, where $0<c<1$.

It should be noted that, a value of the parameter c in this embodiment of this application may be defined by a user, and is not limited in this embodiment of this application.

Figure 8:
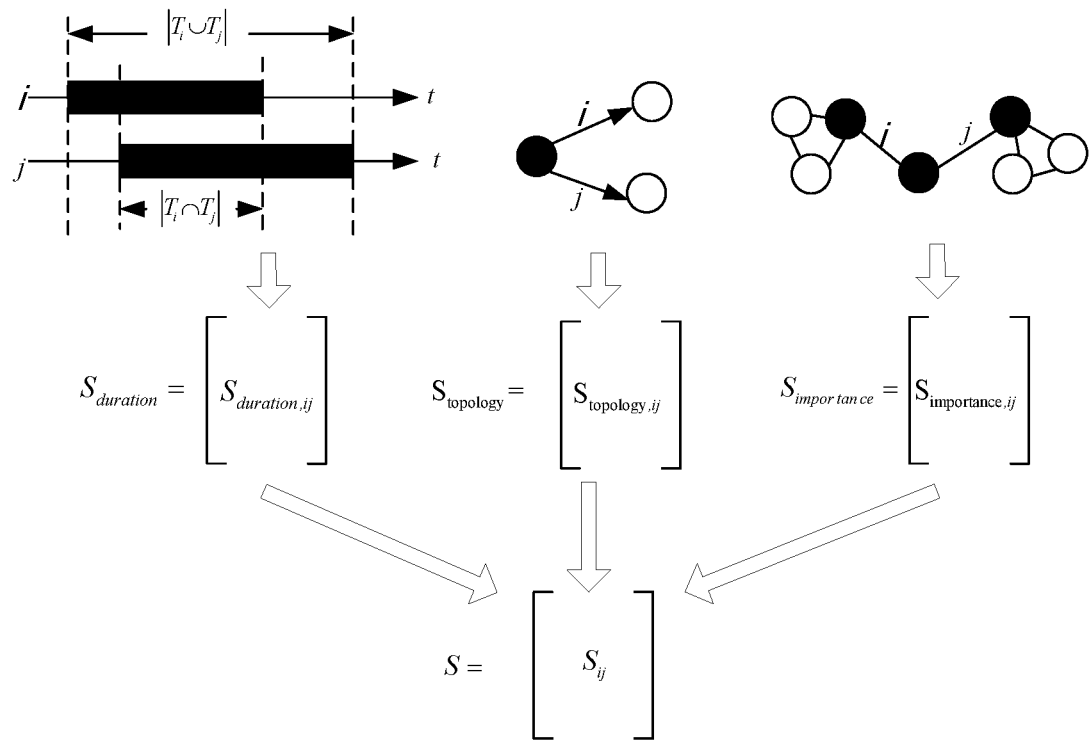
FIG. 8 is a schematic logical diagram of generating a link similarity matrix according to an embodiment of this application.

FIG. 8 is a schematic logical diagram of generating a link similarity matrix based on the embodiment shown in FIG. 6. For details, refer to the foregoing embodiment shown in FIG. 6, and details are not described herein again.

Figure 9:
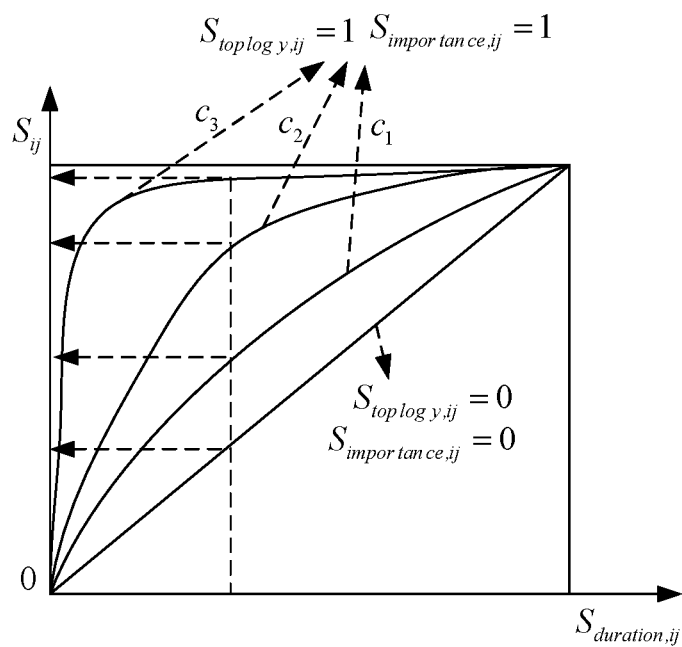
FIG. 9 is a schematic diagram of link similarity curves according to an embodiment of this application.

FIG. 9 is a schematic diagram of link similarity curves according to an embodiment of this application. A horizontal coordinate axis of a coordinate system in the figure represents the similarity between the fault duration of the link i and the fault duration of the link j, and a vertical coordinate axis represents the link similarity between the link i and the link j, where $0<c_3<c_2<c_1<1$. It can be learned from FIG. 9 that when both the similarity between the link i and the link j based on a network topology and the similarity between the link i and the link based on importance are 0, there is no association between the similarity between the link i and the link j in relation to a network topology and the similarity between the link i and the link j in relation to importance, that is, there is no stretching; when both the similarity between the link i and the link j in relation to a network topology and the similarity between the link i and the link j in relation to importance are 1, the degree of stretching is related to c. A smaller c indicates a higher degree of stretching.

In conclusion, this embodiment of this application provides a specific implementation of generating the link similarity matrix based on the fault duration-based link similarity matrix, the network topology-based link similarity matrix, and the importance-based link similarity matrix. Based on the foregoing implementation, when both $S_{topology,ij}$ and $S_{importance,ij}$ are 0, there is no association between the similarity between the link i and the link j in relation to a network topology and the similarity between the link i and the link j in relation to importance, that is, there is no stretching. When both $S_{topology,ij}$ and $S_{importance,ij}$ are 1, the degree of stretching is related to c. A smaller value of c indicates a higher degree of stretching, which conforms to an actual network status. Therefore, a more accurate link similarity matrix can be obtained. Further, this improves accuracy of performing clustering based on the link similarity matrix, and reduces a probability of performing combination analysis on links having no association relationship, thereby improving efficiency of the service survivability analysis.

In one embodiment, operation S504 includes: performing an M-order combination on links in each of the at least one link cluster, to obtain a combination result of the links in each link cluster, where M is a positive integer; and performing survivability analysis on the services on the at least two preset links based on the combination result of the links in each link cluster.

For example, it is assumed that for the subnetwork 2 in FIG. 3, first-order link faults include: (BC), (BH), (BI), (CH), (CI), and (HI). Second-order link fault combinations include: (BC, BH), (BC, BI), (BC, CH), (BC, IC), (BC, HI), (BH, BI), (BH, CH), (BH, CI), (BH, HI), (BI, CH), (BI, CI), (BI, HI), (CH, CI), (CH, HI), and (CI, HI). Third-order link fault combinations include: (BC, BH, BI), (BC, BH, CH), (BC, BH, CI), (BC, BH, HI), . . . .

It can be learned from the foregoing link fault combinations that for only four network devices, there are six first-order links, fifteen second-order link combinations, and twenty third-order link combinations (not all listed). Certainly, there are more first-order links and link combinations of the transmission network in actual application, which is not limited in this embodiment of this application. This embodiment of this application is merely an example for description.

In conclusion, according to the service survivability analysis method provided in this embodiment of this application, due to a relatively strong association between links in each link cluster, a higher-order combination is performed on links in the at least one link cluster, and this can reduce a probability of performing combination on the links having no association relationship, and reduce time used for service survivability analysis on links of higher-order combinations, thereby improving efficiency of the service survivability analysis.

The following provides a time complexity theoretical comparison result obtained by using the prior art and the service survivability analysis method provided in this embodiment of this application.

It is assumed that a link in a transmission network is an optical fiber, and a total quantity of optical fibers is n, and it is assumed that when transmit power of the optical fiber is 0, an optical fiber cut occurs.

A time complexity required for performing full service survivability analysis for an m-order fiber cut of the optical fibers in the transmission network by using the prior art is $T_m = C_n^m$.

According to the service survivability analysis method in this embodiment of this application, first, clustering is performed on the n optical fibers, and it is assumed that a quantity of optical fibers in each obtained link cluster is K. A time complexity required for performing service survivability analysis for an m-order fiber cut of K optical fibers in the link cluster obtained by clustering is $$T'_{m,K} = \frac{n}{K} C_K^m,$$

and times by which efficiency is improved relative to the prior art are $$C_{m,K} = \frac{T_m}{T'_{m,K}} = \frac{K * C_n^m}{n C_K^m}.$$

Figure 10:
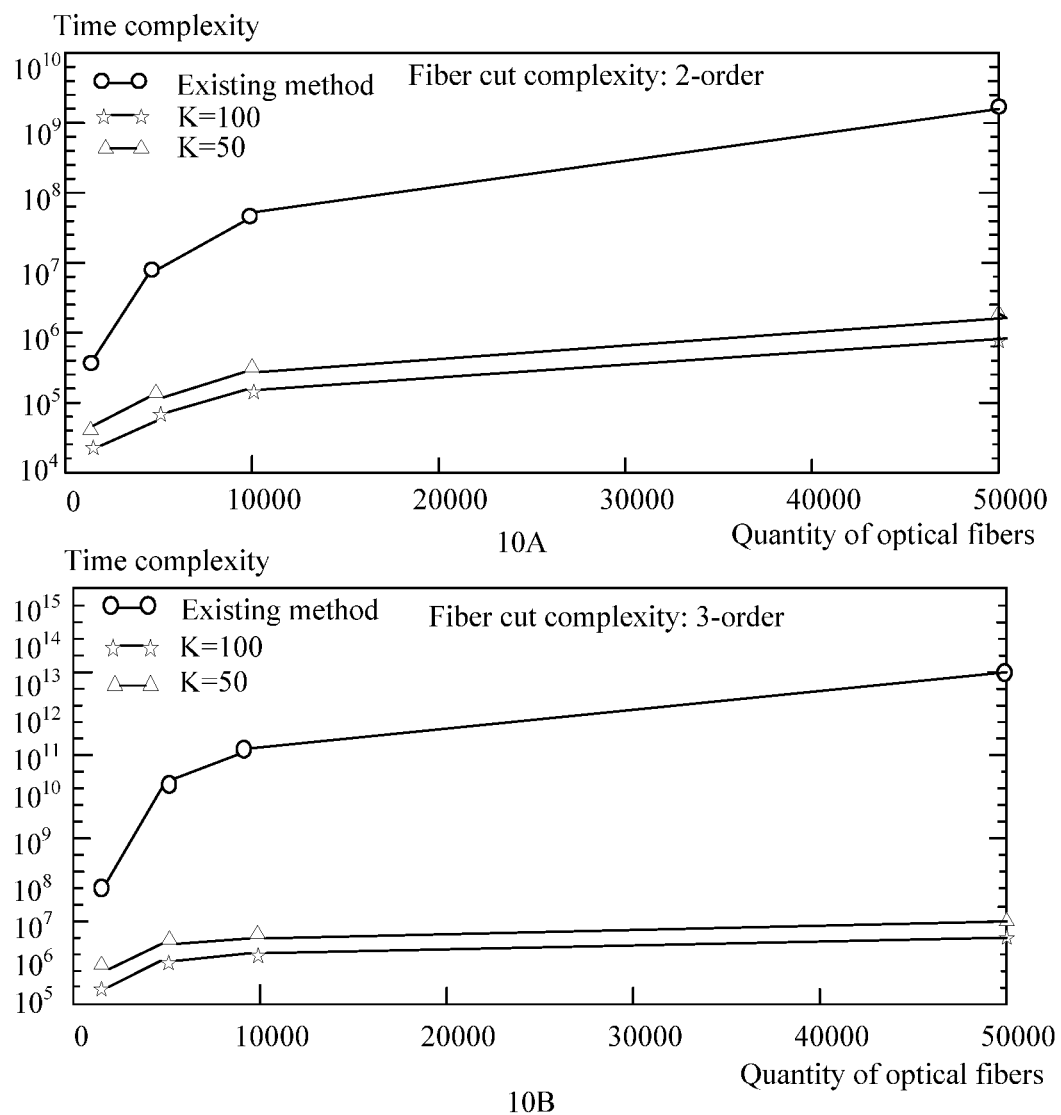
FIG. 10 is a schematic diagram of a comparison curve for time complexities of service survivability analysis according to an embodiment of this application.

FIG. 10 is a schematic diagram of a comparison curve for time complexities required by survivability analysis. The figure is a comparison curve for time complexities required by service survivability analysis by using the prior art and the service survivability analysis method of this embodiment of this application when a quantity of optical fibers in a link cluster is K=50 and when a quantity of optical fibers in a link cluster is K=100.

For example, when n=10000 and service survivability analysis for a second-order fiber cut and service survivability analysis for a third-order fiber cut are performed, a time complexity required by the prior art, time complexities required by the service survivability analysis method in this embodiment of this application when the quantity of optical fibers in the link cluster is K=50 and when the quantity of optical fibers in the link cluster is K=100, and times by which efficiency is improved relative to the prior art are separately calculated.

FIG. 10A is a comparison curve for time complexities required by service survivability analysis for a second-order fiber cut.

A time complexity required by the prior art is $T_2 = C_{10000}^2$. When the quantity of optical fibers in the link cluster is K=50, a time complexity required for performing service survivability analysis for the second-order fiber cut by using the service survivability analysis method in this embodiment of this application is $$T'_{2,50} = \frac{1000}{50} C_{50}^2,$$

and times by which efficiency is improved relative to the prior art are $$C_{2,50} = \frac{T_2}{T'_{2,50}} = \frac{50 * C_{1000}^2}{1000 C_{50}^2}.$$

When the quantity of optical fibers in the link cluster is K=100, a time complexity required for performing service survivability analysis for the second-order fiber cut by using the service survivability analysis method in this embodiment of this application is $$T'_{2,100} = \frac{1000}{100} C_{100}^2,$$

and times by which efficiency is improved relative to the prior art are $$C_{2,100} = \frac{T_2}{T'_{2,100}} = \frac{100 * C_{1000}^2}{1000 C_{100}^2}.$$

FIG. 10B is a comparison curve for time complexities required by service survivability analysis for a third-order fiber cut.

A time complexity required by the prior art is $T_3 = C_{10000}^3$. When the quantity of optical fibers in the link cluster is K=50, a time complexity required for performing service survivability analysis for the third-order fiber cut by using the service survivability analysis method in this embodiment of this application is $$T'_{3,50} = \frac{1000}{50} C_{50}^3,$$

and times by which efficiency is improved relative to the prior art are $$C_{3,50} = \frac{T_3}{T'_{3,50}} = \frac{50 * C_{1000}^3}{1000 C_{50}^3}.$$

When the quantity of optical fibers in the link cluster is K=100, a time complexity required for performing service survivability analysis for the third-order fiber cut by using the service survivability analysis method in this embodiment of this application is $$T'_{3,50} = \frac{1000}{100} C^3_{100},$$

and times by which efficiency is improved relative to the prior art are $$C_{3,100} = \frac{T_3}{T'_{3,100}} = \frac{100 * C^3_{1000}}{1000 C^3_{100}}.$$

It can be learned from FIG. 10 and the foregoing analysis that efficiency of the service survivability analysis method provided in this embodiment of this application is significantly improved in comparison with that of the existing full service survivability analysis method.

The foregoing analysis is merely theoretical analysis, and the following further uses actual network data to provide a time complexity experimental comparison result obtained by using the prior art and the service survivability analysis method provided in this embodiment of this application.

Figure 11:
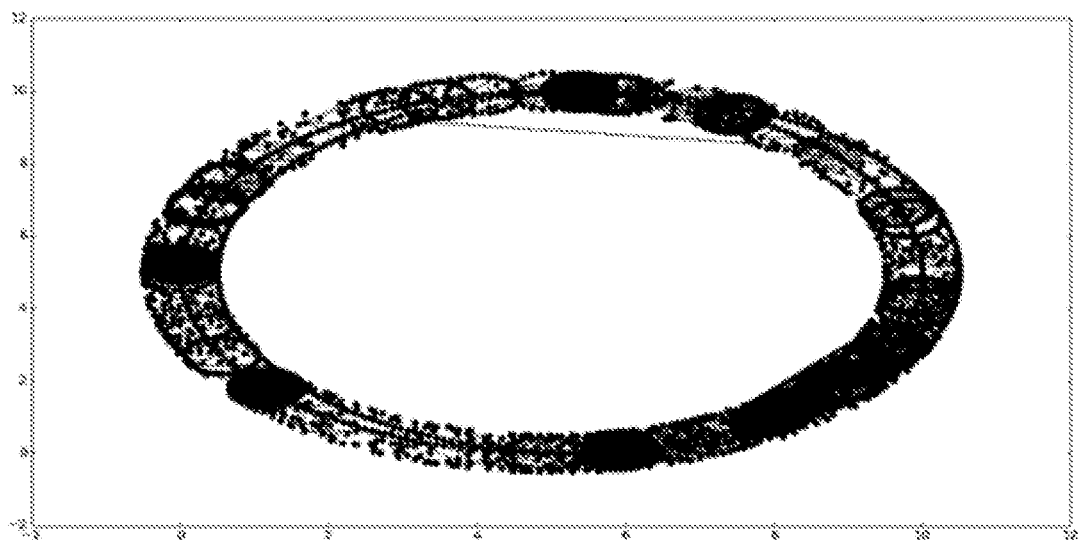
FIG. 11 is a schematic diagram of an optical fiber clustering effect according to an embodiment of this application.

It is assumed that an effect diagram of optical fiber clustering obtained by performing clustering on fiber cuts based on a collected optical fiber cut record and network topology information is shown in FIG. 11. Each black dot in the figure represents an optical fiber, and if two optical fibers break at the same time, a line is connected between two black dots. According to the method provided in this embodiment of this application, clustering is performed on optical fibers in the optical fiber cut record, to obtain at least one link cluster. A larger quantity of optical fibers that break at the same time in each cluster indicates a higher density of connection lines, and a plurality of black shades in the figure are formed. It can be learned from FIG. 11 that the optical fiber cuts have an evident association.

Based on the optical fiber clustering result, service survivability analysis for a second-order fiber cut, a third-order fiber cut, a fourth-order fiber cut, and a fifth-order fiber cut is performed on the optical fibers in the transmission network separately by using the prior art and the service survivability analysis method provided in this embodiment of this application, and time complexities and rate increase times that are shown in Table 1 can be obtained.

It can be learned from Table 1 that in comparison with that using the prior art, the service survivability analysis using the service survivability analysis method provided in this embodiment of this application can achieve a significant rate increase. For example, by using analysis for the second-order fiber cut, a rate can be increased by nearly 51 times, and by using analysis for the fifth-order fiber cut, a rate can be increased by more than 13000 times.

In conclusion, in the service survivability analysis method provided in this embodiment of this application, the link similarity matrix is generated by using the link fault record and the network topology information; then, clustering is performed on all the faulty links based on the link similarity matrix, to obtain the at least one link cluster; and survivability analysis is performed on the services on the at least two preset links based on each of the at least one link cluster. It can be learned, from generating the link similarity matrix by using the link fault record and the network topology information, that the link similarity matrix is determined by finding out a law of links in time and space in this embodiment of this application. Therefore, during clustering analysis on all the faulty links based on the link similarity matrix, the clustering analysis may be performed only on links having a similarity in time and space, thereby avoiding a disadvantage in the prior art that all link faults or a combination of link faults in a transmission network need to be traversed during full service survivability analysis. This greatly reduces time and computing resource overheads required for the full service survivability analysis, and improves efficiency of the service survivability analysis.

That the link fault is an optical fiber cut is used as an example below to describe the service survivability analysis method provided in the foregoing embodiment of this application.

Figure 12A:
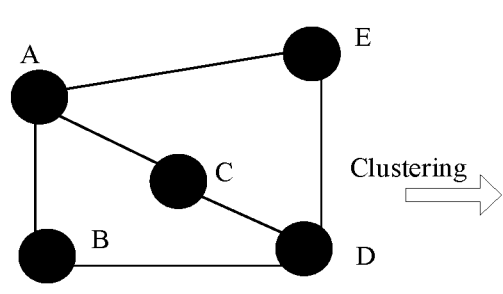
FIGS. 12A-12C are schematic diagrams of a service survivability analysis process according to certain embodiments of this application.

It is assumed that the optical fiber cut record that is in the preset time period and that is obtained by the service survivability analysis apparatus is shown in Table 2, and the network topology information is shown in FIG. 12A.

TABLE 1

|  | Second-order fiber cut | Third-order fiber cut | Fourth-order fiber cut | Fifth-order fiber cut |
| --- | --- | --- | --- | --- |
| Prior art | 3646350.0 | 3280499550.0 | 2.21269694648e+12 | 1.19352873293e+15 |
| Method of this application | 71777.0 | 3606318.0 | 191162856.0 | 9006882500.0 |
| Rate increase (times) | 50.8011 | 909.6534 | 11574.9314 | 132512.9680 |

TABLE 2

| Serial Number | Source end | Sink end | Alarm occur time | Alarm clear time | Alarm level |
|---|---|---|---|---|---|
| 1 | A | B | 2016 Dec. 10 19:00:00 | 2016 Dec. 10 20:00:00 | Critical |
| 2 | A | C | 2016 Dec. 10 19:15:00 | 2016 Dec. 10 20:00:00 | Critical |
| 3 | D | C | 2016 Dec. 10 19:55:00 | 2016 Dec. 10 20:30:00 | Critical |
| 4 | D | B | 2016 Dec. 10 20:00:00 | 2016 Dec. 10 20:40:00 | Critical |
| 5 | E | A | 2016 Dec. 11 9:00:00 | 2016 Dec. 11 9:30:00 | Critical |
| 6 | E | D | 2016 Dec. 11 9:15:00 | 2016 Dec. 11 9:35:00 | Critical |

First, the service survivability analysis apparatus determines, based on formula (1), a similarity between fiber cut duration of any two optical fibers in Table 2 based on alarm occur time and alarm clear time in Table 2, with results shown in Table 3.

TABLE 3

|  | A-B | A-C | D-C | D-B | E-A | E-D |
|---|---|---|---|---|---|---|
| A-B | 1 | 0.75 | 0.056 | 0 | 0 | 0 |
| A-C | 0.75 | 1 | 0.067 | 0 | 0 | 0 |
| D-C | 0.056 | 0.067 | 1 | 0.667 | 0 | 0 |
| D-B | 0 | 0 | 0.667 | 1 | 0 | 0 |
| E-A | 0 | 0 | 0 | 0 | 1 | 0.429 |
| E-D | 0 | 0 | 0 | 0 | 0.429 | 1 |

Data in Table 3 is substituted into a matrix ST, and the fiber cut duration-based optical fiber similarity matrix is:

$$S_T = \begin{bmatrix} 1 & 0.75 & 0.056 & 0 & 0 & 0 \\ 0.75 & 1 & 0.067 & 0 & 0 & 0 \\ 0.056 & 0.067 & 1 & 0.667 & 0 & 0 \\ 0 & 0 & 0.667 & 1 & 0 & 0 \\ 0 & 0 & 0 & 0 & 1 & 0.429 \\ 0 & 0 & 0 & 0 & 0.429 & 1 \end{bmatrix}$$

The service survivability analysis apparatus determines, based on formula (2), a similarity between the any two optical fibers in relation to a network topology in Table 2 based on connection information of network devices in FIG. 12A, with results shown in Table 4.

TABLE 4

|  | A-B | A-C | D-C | D-B | E-A | E-D |
|---|---|---|---|---|---|---|
| A-B | 1 | 1 | 0 | 1 | 1 | 0 |
| A-C | 1 | 1 | 1 | 0 | 1 | 0 |
| D-C | 0 | 1 | 1 | 1 | 0 | 1 |
| D-B | 1 | 0 | 1 | 1 | 0 | 1 |
| E-A | 1 | 1 | 0 | 0 | 1 | 1 |
| E-D | 0 | 0 | 1 | 1 | 1 | 1 |

Data in Table 4 is substituted into a matrix SD, and the network topology-based optical fiber similarity matrix is:

$$S_D = \begin{bmatrix} 1 & 1 & 0 & 1 & 1 & 0 \\ 1 & 1 & 1 & 0 & 1 & 0 \\ 0 & 1 & 1 & 1 & 0 & 1 \\ 1 & 0 & 1 & 1 & 0 & 1 \\ 1 & 1 & 0 & 0 & 1 & 1 \\ 0 & 0 & 1 & 1 & 1 & 1 \end{bmatrix}$$

The service survivability analysis apparatus determines, based on formula (3), a similarity between the any two optical fibers in relation to importance in Table 2 based on the connection information of the network devices in FIG. 12A, with results shown in Table 5.

TABLE 5

|  | A-B | A-C | D-C | D-B | E-A | E-D |
|---|---|---|---|---|---|---|
| A-B | 1 | 0 | 0 | 0 | 0 | 0 |
| A-C | 1 | 1 | 0 | 0 | 0 | 0 |
| D-C | 0 | 0 | 1 | 0 | 0 | 0 |
| D-B | 0 | 0 | 0 | 1 | 0 | 0 |
| E-A | 0 | 0 | 0 | 0 | 1 | 0 |
| E-D | 0 | 0 | 0 | 0 | 0 | 1 |

Data in Table 5 is substituted into a matrix SI, and the importance-based optical fiber similarity matrix is:

$$S_I = \begin{bmatrix} 1 & 0 & 0 & 0 & 0 & 0 \\ 1 & 1 & 0 & 0 & 0 & 0 \\ 0 & 0 & 1 & 0 & 0 & 0 \\ 0 & 0 & 0 & 1 & 0 & 0 \\ 0 & 0 & 0 & 0 & 1 & 0 \\ 0 & 0 & 0 & 0 & 0 & 1 \end{bmatrix}$$

The service survivability analysis apparatus determines, based on formula (4) when a degree of stretching is c=0.5, the optical fiber similarity between the any two optical fibers in Table 2 based on the fiber cut duration-based optical fiber similarity in Table 3, the network topology-based optical fiber similarity in Table 4, and the importance-based optical fiber similarity in Table 5, with results shown in Table 6.

TABLE 6

|  | A-B | A-C | D-C | D-B | E-A | E-D |
|---|---|---|---|---|---|---|
| A-B | 1 | 0.8080127 | 0.056 | 0 | 0 | 0 |
| A-C | 0.8080127 | 1 | 0.16292179 | 0 | 0 | 0 |
| D-C | 0.056 | 0.16292179 | 1 | 0.74185034 | 0 | 0 |
| D-B | 0 | 0 | 0.74185034 | 1 | 0 | 0 |

TABLE 6-continued

|  | A-B | A-C | D-C | D-B | E-A | E-D |
|---|---|---|---|---|---|---|
| E-A | 0 | 0 | 0 | 0 | 1 | 0.54199046 |
| E-D | 0 | 0 | 0 | 0 | 0.54199046 | 1 |

Data in Table 6 is substituted into a matrix S, and the optical fiber similarity matrix is:

$$S = \begin{bmatrix} 1 & 0.8080127 & 0.056 & 0 & 0 & 0 \\ 0.8080127 & 1 & 0.16292179 & 0 & 0 & 0 \\ 0.056 & 0.16292179 & 1 & 0.74185034 & 0 & 0 \\ 0 & 0 & 0.74185034 & 1 & 0 & 0 \\ 0 & 0 & 0 & 0 & 1 & 0.54199046 \\ 0 & 0 & 0 & 0 & 0.54199046 & 1 \end{bmatrix}$$

Figure 12B:
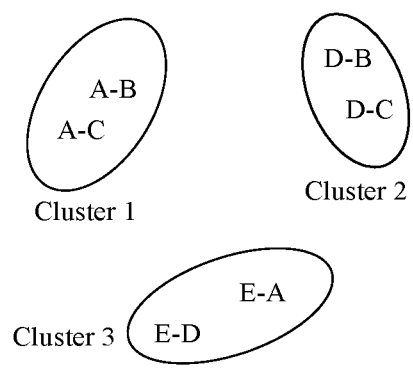

Second, the service survivability analysis apparatus performs clustering based on the optical fiber similarity matrix S by using the spectral clustering algorithm, to obtain three optical fiber clusters. A result is shown in FIG. 12B. The three optical fiber clusters are respectively: cluster 1: A-B and A-C; cluster 2: D-B and D-C; and cluster 3: E-D and E-A.

Finally, the service survivability analysis apparatus performs survivability analysis on services of optical fibers in each of the optical fiber clusters.

Figure 12C:
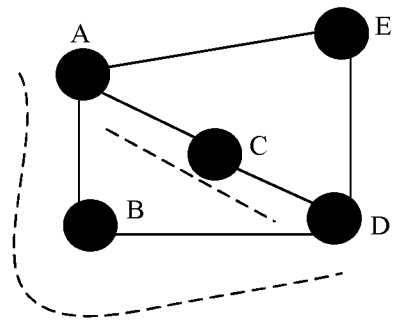

As shown in FIG. 12C, an A-D service in the transmission network is used as an example for performing service survivability analysis.

Step 1: For the cluster 1, simulate a fiber cut for an optical fiber combination of A-B and A-C in the cluster, and analyze impact on the A-D service in the transmission network; and find that the combination fiber cut has severe impact on the A-D service in the transmission network.

Step 2: For the cluster 2, simulate a fiber cut for an optical fiber combination of D-B and D-C in the cluster, and analyze impact on the A-D service in the transmission network; and find that the combination fiber cut has severe impact on the A-D service in the transmission network.

Step 3: For the cluster 3, simulate a fiber cut for an optical fiber combination of E-A and E-D in the cluster, and analyze impact on the A-D service in the transmission network; and find that the combination fiber cut has no impact on the A-D service in the transmission network.

It can be learned from the service survivability analysis results that the A-D service may be interrupted when the optical fiber combination of A-B and A-C or the optical fiber combination of D-B and D-C breaks at the same time. Therefore, a new alternate path may be planned for the A-D service based on the service survivability analysis results. During planning of the alternate path, an optical fiber combination that breaks at the same time in the service survivability analysis results is no longer selected.

It should be noted that a quantity of links in each cluster in this example is the same. In an actual transmission network, a quantity of links in each link cluster may or may not be the same. This is not limited in the embodiments of this application. In addition, when the service survivability analysis is performed, higher-order combination analysis may further be performed in the link cluster. This is not limited in the embodiments of this application.

All or some of the foregoing embodiments may be implemented by using software, hardware, firmware, or any combination thereof. When software is used to implement the embodiments, the embodiments may be implemented completely or partially in a form of a computer program product.

The computer program product includes one or more computer instructions. When the computer program instructions are loaded and executed on the computer, the procedure or functions according to the embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, and microwave) manner. The computer-readable storage medium may be any usable medium accessible by a computer, or a storage device, such as a server or a data center, integrating one or more usable media. The usable medium may be a magnetic medium (for example, a floppy disk, a hard disk, or a magnetic tape), an optical medium (for example, a digital versatile disc (DVD)), a semiconductor medium (for example, a solid state disk (SSD)), or the like.

Although this application is described with reference to the embodiments, in a process of implementing this application that claims protection, a person skilled in the art may understand and implement another variation of the disclosed embodiments by viewing the accompanying drawings, disclosed content, and the accompanying claims. In the claims, "including" (including) does not exclude another component or another step, and "a" or "one" does not exclude a case of plurality. A single processor or another unit may implement several functions enumerated in the claims. Some measures are recorded in dependent claims that are different from each other, but this does not mean that these measures cannot be combined to produce a better effect.

Although this application is described with reference to specific features and the embodiments thereof, obviously, various modifications and combinations may be made to them without departing from the scope of this application. Correspondingly, the specification and accompanying drawings are merely example description of this application defined by the accompanying claims, and considered as any of or all modifications, variations, combinations or equivalents that cover the scope of this application. Obviously, a person skilled in the art can make various modifications and variations to this application without departing from the scope of this application. This application is intended to cover these modifications and variations of this application provided that they fall within the scope of protection defined by the following claims and their equivalent technologies.

What is claimed is:

1. A service survivability analysis method, comprising:
obtaining a link fault record and network topology information that are in a preset time period, wherein the link fault record comprises a fault occurrence time and a fault removal time of each of a plurality of faulty links in at least two preset links in the preset time period, and the network topology information comprises connection information of network devices on the plurality of faulty links;
determining a similarity between any two links in the plurality of faulty links based on fault occurrence times and fault removal times of the any two links in the link fault record and connection information of network devices on the any two links, to obtain a link similarity matrix, including:
determining fault durations of the any two links based on the fault occurrence time and the fault removal time of each of the any two links in the link fault record,
determining a similarity between the fault durations of the any two links based on the fault durations of the any two links, to obtain a fault duration-based link similarity matrix,
determining a similarity between the any two links in relation to a network topology based on the connection information of the network devices on the any two links to obtain a network topology-based link similarity matrix,
determining a similarity between the any two links in relation to their importance to network connections in the network topology based on the connection information of the network devices on the any two links, to obtain an importance-based link similarity matrix, and
generating the link similarity matrix based on the fault duration-based link similarity matrix, the network topology-based link similarity matrix, and the importance-based link similarity matrix;
performing clustering on all the faulty links based on the link similarity matrix to obtain at least one link cluster; and
performing a survivability analysis on services on the at least two preset links based on each of the at least one link cluster.

2. The method according to claim 1, wherein the determining the similarity between the fault durations of the any two links based on the fault durations of the any two links to obtain a fault duration-based link similarity matrix comprises:
determining, based on a first preset formula, the similarity between the fault durations of the any two links based on the fault durations of the any two links to obtain the fault duration-based link similarity matrix, wherein the first preset formula comprises:

$$S_{duration,ij} = \frac{|T_i \cap T_j|}{|T_i \cup T_j|},$$

wherein
$S_{duration,ij}$ represents a similarity between a fault duration of a link i and a fault duration of a link j, $T_i$ represents the fault duration of the link i, $T_j$ represents the fault duration of the link j, $|T_i \cap T_j|$ represents an intersection of the fault duration of the link i and the fault duration of the link j, and $|T_i \cup T_j|$ represents a union of the fault duration of the link i and the fault duration of the link j.

3. The method according to claim 1, wherein the determining the similarity between the any two links in relation to the network topology based on the connection information of the network devices on the any two links to obtain the network topology-based link similarity matrix comprises:
determining, based on a second preset formula, the similarity between the any two links in relation to the network topology based on the connection information of the network devices on the any two links, to obtain the network topology-based link similarity matrix, wherein
the second preset formula comprises:

$$S_{topology,ij} = \begin{cases} 1, & \text{if } L_{i,src} = L_{j,dst} \text{ and } L_{j,src} = L_{i,dst} \\ 1, & \text{if } L_{i,src} = L_{j,src} \text{ or } L_{i,dst} = L_{j,src} \\ 0, & \text{else} \end{cases},$$

wherein $S_{topology,ij}$ represents a similarity between the link i and the link j in relation to the network topology, $L_{i,src}$ represents a source end of the link i, $L_{i,dst}$ represents a destination end of the link i, $L_{j,src}$ represents a source end of the link j, and $L_{j,dst}$ represents a destination end of the link j.

4. The method according to claim 1, wherein the determining a similarity between the any two links in relation to their importance based on the connection information of the network devices on the any two links to obtain an importance-based link similarity matrix comprises:
determining, based on a third preset formula, the similarity between the any two links in relation to their importance to the network connections based on the connection information of the network devices on the any two links, to obtain the importance-based link similarity matrix, wherein
the third preset formula comprises:

$$S_{importance,ij} = \begin{cases} 1, & \text{if } L_i \in B_L \text{ and } L_j \in B_L \\ 0, & \text{else} \end{cases},$$

wherein $S_{importance,ij}$ represents a similarity between the link i and the link j in relation to their importance to the network connections, $L_i$ represents the link i, $L_j$ represents the link j, $B_L$ is a set of bridge links, and the bridge link set $B_L$ is determined based on the network topology information.

5. The method according to claim 1, wherein the generating the link similarity matrix based on the fault duration-based link similarity matrix, the network topology-based link similarity matrix, and the importance-based link similarity matrix comprises:

generating, based on a fourth preset formula, the link similarity matrix based on the fault duration-based link similarity matrix, the network topology-based link similarity matrix, and the importance-based link similarity matrix, wherein
the fourth preset formula comprises:

$$S_{ij} = 0.5 \times (S_{duration,ij})^{(1-c \times S_{topology,ij})} + (S_{duration,ij})^{(1-c \times S_{importance,ij})}, \text{ wherein}$$

$S_{ij}$ represents a link similarity between the link i and the link j, $S_{duration,ij}$ represents the similarity between the fault duration of the link i and the fault duration of the link j, $S_{topology,ij}$ represents the similarity between the link i and the link j in relation to a network topology, $S_{importance,ij}$ represents the similarity between the link i and the link j in relation to their importance to the network connections, and c represents a degree of stretching, wherein 0<c<1.

6. The method according to claim 1, wherein the performing attic survivability analysis on services on the at least two preset links based on each of the at least one link cluster comprises:
performing an M-order combination on links in each of the at least one link cluster to obtain a combination result of the links in each link cluster, wherein M is a positive integer; and
performing the survivability analysis on the services on the at least two preset links based on the combination result of the links in each link cluster.

7. A service survivability analysis apparatus, comprising:
a processor; and
a memory storing a computer-executable instruction, which when executed by the processor, cause the processor to perform a service survivability analysis method, the method comprising,
obtaining a link fault record and network topology information that are in a preset time period, wherein the link fault record comprises a fault occurrence time and a fault removal time of each of a plurality of faulty links in at least two preset links in the preset time period, and the network topology information comprises connection information of network devices on the plurality of faulty links;
determining a similarity between any two links in the plurality of faulty links based on fault occurrence times and fault removal times of the any two links in the link fault record and connection information of network devices on the any two links, to obtain a link similarity matrix, including:
determining fault durations of the any two links based on the fault occurrence time and the fault removal time of each of the any two links in the link fault record,
determining a similarity between the fault durations of the any two links based on the fault durations of the any two links, to obtain a fault duration-based link similarity matrix,
determining a similarity between the any two links in relation to a network topology based on the connection information of the network devices on the any two links to obtain a network topology-based link similarity matrix,
determining a similarity between the any two links in relation to their importance to network connections in the network topology based on the connection information of the network devices on the any two links, to obtain an importance-based link similarity matrix, and
generating the link similarity matrix based on the fault duration-based link similarity matrix, the network topology-based link similarity matrix, and the importance-based link similarity matrix;
performing clustering on all the faulty links based on the link similarity matrix to obtain at least one link cluster; and
performing a survivability analysis on services on the at least two preset links based on each of the at least one link cluster.

8. The apparatus according to claim 7, wherein the determining the similarity between the fault durations of the any two links based on the fault durations of the any two links to obtain a fault duration-based link similarity matrix comprises:
determining, based on a first preset formula, the similarity between the fault durations of the any two links based on the fault durations of the any two links to obtain the fault duration-based link similarity matrix, wherein
the first preset formula comprises:

$$S_{duration,ij} = \frac{|T_i \cap T_j|}{|T_i \cup T_j|},$$

wherein $S_{duration,ij}$ represents a similarity between a fault duration of a link i and a fault duration of a link i, $T_i$ represents the fault duration of the link i, $T_j$ represents the fault duration of the link j, $|T_i \cap T_j|$ represents an intersection of the fault duration of the link i and the fault duration of the link j, and $|T_i \cup T_j|$ represents a union of the fault duration of the link i and the fault duration of the link j.

9. The apparatus according to claim 7, wherein the determining a similarity between the any two links in relation to a network topology based on the connection information of the network devices on the any two links to obtain a network topology-based link similarity matrix comprises:
determining, based on a second preset formula, the similarity between the any two links in relation to the network topology based on the connection information of the network devices on the any two links, to obtain the network topology-based link similarity matrix, wherein the second preset formula comprises:

$$S_{topology,ij} = \begin{cases} 1, & \text{if } L_{i,src} = L_{j,dst} \text{ and } L_{j,src} = L_{i,dst} \\ 1, & \text{if } L_{i,src} = L_{j,src} \text{ or } L_{i,dst} = L_{j,src} \\ 0, & \text{else} \end{cases},$$

wherein $S_{topology,ij}$ represents a similarity between the link i and the link j in relation to the network topology, $L_{i,src}$ represents a source end of the link i, $L_{i,dst}$ represents a destination end of the link i, $L_{j,src}$ represents a source end of the link j, and $L_{j,dst}$ represents a destination end of the link j.

10. The apparatus according to claim 7, wherein the determining a similarity between the any two links in relation to their importance to the network connections based on the connection information of the network devices on the any two links, to obtain an importance-based link similarity matrix comprises:

determining, based on a third preset formula, the similarity between the any two links in relation to their importance based on the connection information of the network devices on the any two links, to obtain the importance-based link similarity matrix, wherein the third preset formula comprises:

$$S_{importance,ij} = \begin{cases} 1, & \text{if } L_i \in B_L \text{ and } L_j \in B_L \\ 0, & \text{else} \end{cases},$$

wherein $S_{importance,ij}$ represents a similarity between the link i and the link j in relation to their importance to the network connections, $L_i$ represents the link i, $L_j$ represents the link j, $B_L$ is a set of bridge links, and the bridge link set $B_L$ is determined based on the network topology information.

11. The apparatus according to claim 7, wherein the generating the link similarity matrix based on the fault duration-based link similarity matrix, the network topology-based link similarity matrix, and the importance-based link similarity matrix comprises:
generating, based on a fourth preset formula, the link similarity matrix based on the fault duration-based link similarity matrix, the network topology-based link similarity matrix, and the importance-based link similarity matrix, wherein the fourth preset formula comprises: $S_{ij}=0.5\times(S_{duration,ij})^{(1-c\times S_{topology,ij})}+(S_{duration,ij})^{(1-c\times S_{importance,ij})}$, wherein $S_{ij}$ represents a link similarity between the link i and the link j, $S_{duration,ij}$ represents the similarity between the fault duration of the link i and the fault duration of the link j, $S_{topology,ij}$ represents the similarity between the link i and the link j in relation to the network topology, $S_{importance,ij}$ represents the similarity between the link i and the link j in relation to their importance, and c represents a degree of stretching, wherein 0<c<1.

12. The apparatus according to claim 7, wherein the performing the survivability analysis on services on the at least two preset links based on each of the at least one link cluster comprises:
performing an M-order combination on links in each of the at least one link cluster, to obtain a combination result of the links in each link cluster, wherein M is a positive integer; and
performing the survivability analysis on the services on the at least two preset links based on the combination result of the links in each link cluster.

13. A non-transitory computer readable storage medium having a computer instruction stored therein, which when executed on a service survivability analysis apparatus, cause the service survivability analysis apparatus to perform a service survivability analysis method, the method comprising:
obtaining a link fault record and network topology information that are in a preset time period, wherein the link fault record comprises a fault occurrence time and a fault removal time of each of a plurality of faulty links in at least two preset links in the preset time period, and the network topology information comprises connection information of network devices on the plurality of faulty links;
determining a similarity between any two links in the plurality of faulty links based on fault occurrence times and fault removal times of the any two links in the link fault record and connection information of network devices on the any two links, to obtain a link similarity matrix, including:
determining fault durations of the any two links based on the fault occurrence time and the fault removal time of each of the any two links in the link fault record,
determining a similarity between the fault durations of the any two links based on the fault durations of the any two links, to obtain a fault duration-based link similarity matrix,
determining a similarity between the any two links in relation to a network topology based on the connection information of the network devices on the any two links to obtain a network topology-based link similarity matrix,
determining a similarity between the any two links in relation to their importance to network connections in the network topology based on the connection information of the network devices on the any two links, to obtain an importance-based link similarity matrix, and
generating the link similarity matrix based on the fault duration-based link similarity matrix, the network topology-based link similarity matrix, and the importance-based link similarity matrix;
performing clustering on all the faulty links based on the link similarity matrix to obtain at least one link cluster; and
performing a survivability analysis on services on the at least two preset links based on each of the at least one link cluster.

14. The computer readable storage medium according to claim 13, wherein the determining the similarity between the fault durations of the any two links based on the fault durations of the any two links to obtain a fault duration-based link similarity matrix comprises:
determining, based on a first preset formula, the similarity between the fault durations of the any two links based on the fault duration of the any two links to obtain the fault duration-based link similarity matrix, wherein the first preset formula comprises:

$$S_{duration,ij} = \frac{|T_i \cap T_j|}{|T_i \cup T_j|},$$

wherein $S_{duration,ij}$ represents a similarity between fault duration of a link i and fault duration of a link j, $T_i$ represents fault duration of the link i, $T_j$ represents fault duration of the link j, $|T_i \cap T_j|$ represents an intersection of the fault duration of the link i and the fault duration of the link j, and $|T_i \cup T_j|$ represents a union of the fault duration of the link i and the fault duration of the link j.

15. The computer readable storage medium according to claim 13, wherein the determining a similarity between the any two links in relation to the network topology based on the connection information of the network devices on the any two links to obtain a network topology-based link similarity matrix comprises:
determining, based on a second preset formula, the similarity between the any two links in relation to a network topology based on the connection information of the network devices on the any two links, to obtain the network topology-based link similarity matrix, wherein the second preset formula comprises:

$$S_{topology,ij} = \begin{cases} 1, & \text{if } L_{i,src} = L_{j,dst} \text{ and } L_{j,src} = L_{i,dst} \\ 1, & \text{if } L_{i,src} = L_{j,src} \text{ or } L_{i,dst} = L_{j,src} \\ 0, & \text{else} \end{cases},$$

wherein $S_{topology,ij}$ represents a similarity between the link i and the link j in relation to a network topology, $L_{i,src}$ represents a source end of the link i, $L_{i,dst}$ represents a destination end of the link i, $L_{j,src}$ represents a source end of the link j, and $L_{j,dst}$ represents a destination end of the link j.

16. The computer readable storage medium according to claim 13, wherein the determining a similarity between the any two links in relation to their importance the network connections based on the connection information of the network devices on the any two links, to obtain an importance-based link similarity matrix comprises:

determining, based on a third preset formula, the similarity between the any two links in relation to their importance to the network connections based on the connection information of the network devices on the any two links, to obtain the importance-based link similarity matrix, wherein the third preset formula comprises:

$$S_{importance,ij} = \begin{cases} 1, & \text{if } L_i \in B_L \text{ and } L_j \in B_L \\ 0, & \text{else} \end{cases},$$

wherein $S_{importance,ij}$ represents a similarity between the link i and the link j in relation to importance, $L_i$ represents the link i, $L_j$ represents the link j, $B_L$ is a set of bridge links, and the bridge link set $B_L$ is determined based on the network topology information.

17. The computer-readable storage medium according to claim 13, wherein the generating the link similarity matrix based on the fault duration-based link similarity matrix, the network topology-based link similarity matrix, and the importance-based link similarity matrix comprises:

generating, based on a fourth preset formula, the link similarity matrix based on the fault duration-based link similarity matrix, the network topology-based link similarity matrix, and the importance-based link similarity matrix, wherein the fourth preset formula comprises: $S_{ij}=0.5\times(S_{duration,ij})^{(1-c\times S_{topology,ij})}+(S_{duration,ij})^{(1-c\times S_{importance,ij})}$, wherein $S_{ij}$ represents a link similarity between the link i and the link j, $S_{duration,ij}$ represents the similarity between the fault duration of the link i and the fault duration of the link j, $S_{topology,ij}$ represents the similarity between the link i and the link j in relation to a network topology, $S_{importance,ij}$ represents the similarity between the link i and the link j in relation to their importance to the network connections, and c represents a degree of stretching, wherein $0<c<1$.

* * * * *